(12) United States Patent
Black et al.

(10) Patent No.: US 10,884,437 B1
(45) Date of Patent: Jan. 5, 2021

(54) CONTINUOUS FLUID METERING SYSTEM

(71) Applicant: FlowCore Systems, LLC, Williston, ND (US)

(72) Inventors: Charles D. Black, Williston, ND (US); Ian C. Black, Williston, ND (US); Alec J. Driscoll, Williston, ND (US); Steven E. Hayden, Williston, ND (US)

(73) Assignee: FlowCore Systems, LLC, Williston, ND (US)

( * ) Notice: Subject to any disclaimer, the term of this patent is extended or adjusted under 35 U.S.C. 154(b) by 0 days.

(21) Appl. No.: 16/659,759

(22) Filed: Oct. 22, 2019

(51) Int. Cl.
*G05D 7/06* (2006.01)
*E21B 33/068* (2006.01)

(52) U.S. Cl.
CPC ......... *G05D 7/0652* (2013.01); *E21B 33/068* (2013.01)

(58) Field of Classification Search
CPC ............. E21B 2200/00; E21B 2200/01; E21B 2200/02; E21B 2200/03; E21B 2200/04; E21B 2200/05; E21B 2200/06; E21B 2200/08; E21B 2200/09; E21B 2200/20; E21B 2200/22; E21B 41/02; E21B 43/40; E21B 44/00
See application file for complete search history.

(56) References Cited

U.S. PATENT DOCUMENTS

| | | |
|---|---|---|
| 4,282,093 A | 8/1981 | Haga |
| 4,538,445 A | 9/1985 | Kenik |
| 4,648,043 A | 3/1987 | O'Leary |
| 6,074,551 A | 6/2000 | Jones |
| 6,129,104 A | 10/2000 | Ellard |
| 6,200,466 B1 | 3/2001 | Bender |
| 6,773,611 B2 | 8/2004 | Perlich |
| 6,981,553 B2 | 1/2006 | Stegemeier |
| 7,263,448 B2 | 8/2007 | Brown |
| 7,955,853 B2 | 6/2011 | Hicks |

(Continued)

FOREIGN PATENT DOCUMENTS

KR 20130066108 6/2013

OTHER PUBLICATIONS http://www.enbasesolutions.com/index.php; Chemical Automation System from Enbase Solutions; Received and Printed on Sep. 30, 2014.

(Continued)

*Primary Examiner* — James G Sayre
(74) *Attorney, Agent, or Firm* — Neustel Law Offices

(57) ABSTRACT

A continuous fluid metering system for continuously dispensing a fluid for injection and for accurately measuring the fluid dispensed. The system generally includes one or more fill valves for transferring fluid from an additive tank to first and second measuring tubes, one or more injection valves for directing fluid dispensed by the measuring tubes to an injection point such as an oil well, a pump, and first and second sensors that indicate the volume of fluid dispensed by the first and second measuring tubes as it is dispensed. The system also includes a control unit that controls the injection and fill valves to cause the fluid dispensed from the first and second measuring tubes to be alternately and continuously and directed to the injection point, and the first and second measuring tubes to be alternately and repeatedly refilled without substantial interrupting the flow of fluid to the injection point.

22 Claims, 6 Drawing Sheets

(56) References Cited

U.S. PATENT DOCUMENTS

| | | | |
|---|---|---|---|
| 8,066,940 B2 | 11/2011 | Denkewicz, Jr. | |
| 8,515,581 B2 | 8/2013 | Piironen | |
| 8,532,829 B2 | 9/2013 | Haller | |
| 10,144,653 B2 * | 12/2018 | Black | C02F 1/686 |
| 10,472,255 B2 * | 11/2019 | Black | G01F 23/14 |
| 2004/0149436 A1 | 8/2004 | Sheldon | |
| 2005/0115712 A1 * | 6/2005 | Watson | G01F 11/06 |
| | | | 166/311 |
| 2005/0166961 A1 * | 8/2005 | Means | E21B 37/06 |
| | | | 137/13 |
| 2009/0112364 A1 | 4/2009 | Chen | |
| 2011/0241230 A1 | 10/2011 | Kerfoot | |
| 2013/0068532 A1 | 3/2013 | Bansal | |
| 2013/0126152 A1 | 5/2013 | Banks | |
| 2013/0153231 A1 | 6/2013 | Ayres | |
| 2013/0192841 A1 | 8/2013 | Feasey | |
| 2013/0319660 A1 * | 12/2013 | Vickers | E21B 34/02 |
| | | | 166/250.01 |
| 2015/0090645 A1 | 4/2015 | Black | |
| 2019/0100444 A1 | 4/2019 | Black | |

OTHER PUBLICATIONS

PCT Search Report Received from the International Searching Authority; Received and Printed dated Jan. 6, 2015.

Wave Control Systems Ltd Uninterruptable Chemical Supply System Operational Brochure; Prior to Application Filing Date.

http://wavecontrol.ca/our-products/chemical-injection-metering-and-monitoring-packages/; Wave Control Systems Ltd Webpage; Prior to Application Filing Date.

http://www.profireenergy.com/products/PC180_fuel_package.html; Profire Energy PC180 Full Tank Package Webpage; Prior to Application Filing Date.

http://www.graco.com/us/en/products/business-unit/ong.html; Graco Oil & Natural Gas Product Webpage; Prior to Application Filing Date.

* cited by examiner

CONTINUOUS FLUID METERING SYSTEM

CROSS REFERENCE TO RELATED APPLICATIONS

STATEMENT REGARDING FEDERALLY SPONSORED RESEARCH OR DEVELOPMENT

Not applicable to this application.

BACKGROUND

Field

Example embodiments in general relate to a continuous fluid metering system for continuously dispensing a fluid and accurately measuring the fluid dispensed.

Related Art

Any discussion of the related art throughout the specification should in no way be considered as an admission that such related art is widely known or forms part of common general knowledge in the field.

There is a need in the oil and gas industry and other industries to inject certain fluids into injection ports of various injection points for various purposes. For example, an oil well produces a mixture of oil, water, and gas. Sometimes the water has a high level of salt content which can result in the accumulation of salt within the tubing and various other components of the well. To remedy this problem, fresh water may be pumped down the oil well to reduce the concentration of salt within the salt water.

A chemical additive fluid may be injected into an injection portion of the oil well to act as a scale inhibitor, a corrosion inhibitor, a desalination chemical and/or a biocide. The chemical additive fluid may be directly injected into the oil well. For example, the additive fluid may be pumped to the bottom of the oil well using a "capillary string," which is a narrow capillary tubing that extends along the passage between the casing and the tubing of the oil well. The liquid chemicals may also be injected between the tubing and casing at the top of the well allowing the liquid chemicals to pass through the space between the casing and the tubing. Alternatively, the additive fluid may be injected into and mixed with a carrier fluid such as fresh water and the mixture may then be pumped down the oil well between the casing and the tubing to the bottom of the well.

Once brought to the surface, the oil is present in a mixture of oil, water and natural gas, which are separately processed. The natural gas, for example, may be transported to a gas plant for processing and/or a gas compressor station for distribution via one or more pipelines. Methanol may be injected into injection ports in the pipelines and/or at the plant or station to reduce the freezing temperature residual water that may be present to prevent it from freezing and blocking or causing damage to the pipelines, the plant or the station. Additionally, Triazene, or some other hydrogen sulfide scavenger, may be injected into injection ports in the pipelines and/or at the plant or station to reduce the amount of hydrogen sulfide to a safe level. Hydrogen sulfide is dangerous at levels over 10 parts per million (PPM). In some instances, hydrogen sulfide levels in natural gas can reach as high as 2000 PPM. By accurately controlling the injection of Triazene, the hydrogen sulfide levels can be reduced to as low as 1 PPM.

It is important to be able to accurately determine the volume of additive fluid injected into an injection point, such as an oil well, either directly or indirectly as mixed with a carrier fluid like water or a gas like natural gas. Similarly, it is important to be able to accurately determine the total volume of fluid injected into an injection point over a plurality of fluid injection cycles.

Some metering and dispensing systems for injecting additive fluids into an oil well utilize conventional chemical metering pumps that dispense small doses of additive fluid either directly into the well or into a fluid carrier, such as water, for injection into the well. However, conventional metering pumps are not particularly accurate.

In a system for injecting a chemical additive fluid into multiple ports of an injection point or a series of injection points, a holding tank holds a volume of the additive fluid and a plurality of measuring tubes dispense the fluid for injection. The additive fluid to be injected into one port of an injection point is dispensed from one measuring tube. After that injection is completed, the additive fluid to be injected into another port of the same or another injection point is dispensed from another measuring tube.

There sometimes arises a need to inject a volume of additive fluid into an injection port of an injection point that exceeds the capacity of a single measuring tube. At the same time, it may be desirable to inject the entire volume of additive fluid to be injected in a single continuous injection cycle without substantial interruption in the flow of the fluid being injected. It remains important in this situation to also accurately determine the total volume of additive fluid injected.

The continuous fluid metering system described herein addresses these needs and the deficiencies in the related art by providing a system that can carry out a continuous fluid dispensing and injection process and accurately determine the volume of additive fluid dispensed. The system carries out a plurality of fluid dispensing cycles in which an additive fluid is alternately dispensed from each of a plurality of measuring tubes so that the additive fluid is dispensed substantially continuously. The additive fluid is directed to an injection point for injection substantially continuously and without substantial interruption in the flow of the fluid. The system is able alternately to refill a measuring tube from which the additive fluid has been dispensed as the additive fluid is being dispensed from another measuring tube without interrupting the flow of the additive fluid to the injection point. The system is also able to accurately determine the volume of the additive fluid dispensed from each measuring tube as it is dispensed, to accurately determine the volume of the additive fluid dispensed from a measuring tube in a fluid dispensing cycle, and to accurately determine the total volume of additive fluid dispensed over a plurality of fluid dispensing cycles.

SUMMARY

An example embodiment is directed to a continuous fluid metering system. The continuous fluid metering system includes an additive tank for holding a fluid to be injected into a fluid injection point, a first measuring tube coupled to the additive tank and adapted to receive the fluid from the additive tank and to dispense the fluid, and a second measuring tube coupled to the additive tank and adapted to receive the fluid from the additive tank and to dispense the fluid.

The continuous fluid metering system also includes a first fill valve coupled to the additive tank and to the first measuring tube and a second fill valve coupled to the additive tank and to the second measuring tube. The first fill valve is operable to selectively transfer the fluid from the additive tank to the first measuring tube and the second fill valve is operable to selectively transfer the fluid from the additive tank to the second measuring tube. Alternatively, the continuous fluid metering system includes a fill valve that is coupled to the additive tank, to the first measuring tube, and to the second measuring tube. The fill valve is selectively operable to be in a first state and a second state. In the first state the fill valve is adapted to transfer the fluid from the additive tank to the first measuring tube and in the second state the fill valve is adapted to transfer the fluid can from the additive tank to the second measuring tube.

The continuous fluid metering system also includes a first injection valve coupled to the first measuring tube and a second injection valve coupled to the second measuring tube. The first injection valve is operable to selectively direct the fluid dispensed from the first measuring tube to the fluid injection point and the second injection valve is operable to selectively direct the fluid dispensed from the second measuring tube to the fluid injection point. Alternatively, the continuous fluid metering system includes an injection valve that is coupled to the first measuring tube and to the second measuring tube. The injection valve is selectively operable to be in a first state and in a second state. In the first state the injection valve is adapted to direct the fluid dispensed from the first measuring tube to the fluid injection point. In the second state the injection valve is adapted to direct the fluid dispensed from the second measuring tube to the fluid injection point.

The continuous fluid metering system also includes a control unit. The control unit is in communication with the first fill valve, the second fill valve, the first injection valve, and the second injection valve. Alternatively, the control unit is in communication with the fill valve and the injection valve. The control unit is configured to carry out a continuous dispensing and injection process that includes a plurality of fluid dispensing cycles and a plurality of fluid fill and refill cycles.

The control unit is configured to control the first injection valve and the second injection valve to carry out the plurality of fluid dispensing cycles. During the plurality of fluid dispensing cycles, the fluid alternately is dispensed from the first measuring tube and directed to the injection point by the first injection valve, and is dispensed from the second measuring tube and directed by the second injection valve to the injection point so that the fluid is continuously dispensed and directed to the injection point without substantial interruption in the flow.

Alternatively, the control unit is configured to control the injection valve to alternately place it in the first state to direct the fluid dispensed from the first measuring tube to the injection point, and in the second state to direct the fluid dispensed from the second measuring tube to the injection point, again so that the fluid is dispensed continuously dispensed and directed to the injection point without substantial interruption in the flow.

The control unit is configured to control the first fill valve and the second fill valve to carry out the plurality of fluid fill and refill cycles. The control unit is configured to control the first fill valve to carry out a first initial fill cycle to fill the first measuring tube with the fluid from the additive tank and the second fill valve to carry out a second initial fill cycle to fill the second measuring tube with the fluid from the additive tank prior to carrying out the plurality of fluid dispensing cycles. Alternatively, the control unit is configured to place the fill valve in the first state to carry out the first initial fill cycle and in the second state to carry out the second initial fill cycle.

The control unit also is configured to carry out a plurality of fluid refill cycles simultaneously with the plurality of fluid dispensing cycles. During the plurality of fluid refill cycles, the control unit is configured alternately to control the first fill valve and the second fill valve so that the fluid from the additive tank is transferred to the first measuring tube by the first fill valve and to the second measuring tube by the second fill valve to alternately and repeatedly refill the first measuring tube and the second measuring tube with the fluid. Alternatively, the control unit is configured to alternately place the fill valve in the first state and in the second state to carry out the plurality of refill cycles.

During the course of the continuous dispensing and injection process, the control unit is configured to determine the volume of the fluid dispensed from the first measuring tube and from the second measuring tube as it is dispensed. The control unit also is configured to determine the volume of the fluid dispensed during the plurality of fluid dispensing cycles and the volume of fluid in the additive tank.

During the course of the continuous dispensing and injection process, which can continue indefinitely, the fluid is alternately dispensed from the first and second measuring tubes continuously and without substantial interruption in flow, and is directed to the fluid injection point for injection continuously without substantial interruption.

There has thus been outlined, rather broadly, some of the embodiments of the continuous fluid metering system in order that the detailed description thereof may be better understood, and in order that the present contribution to the art may be better appreciated. There are additional embodiments of the continuous fluid metering system that will be described hereinafter and that will form the subject matter of the claims appended hereto. In this respect, before explaining at least one embodiment of the continuous fluid metering system in detail, it is to be understood that the continuous fluid metering system is not limited in its application to the details of construction or to the arrangements of the components set forth in the following description or illustrated in the drawings. The continuous fluid metering system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
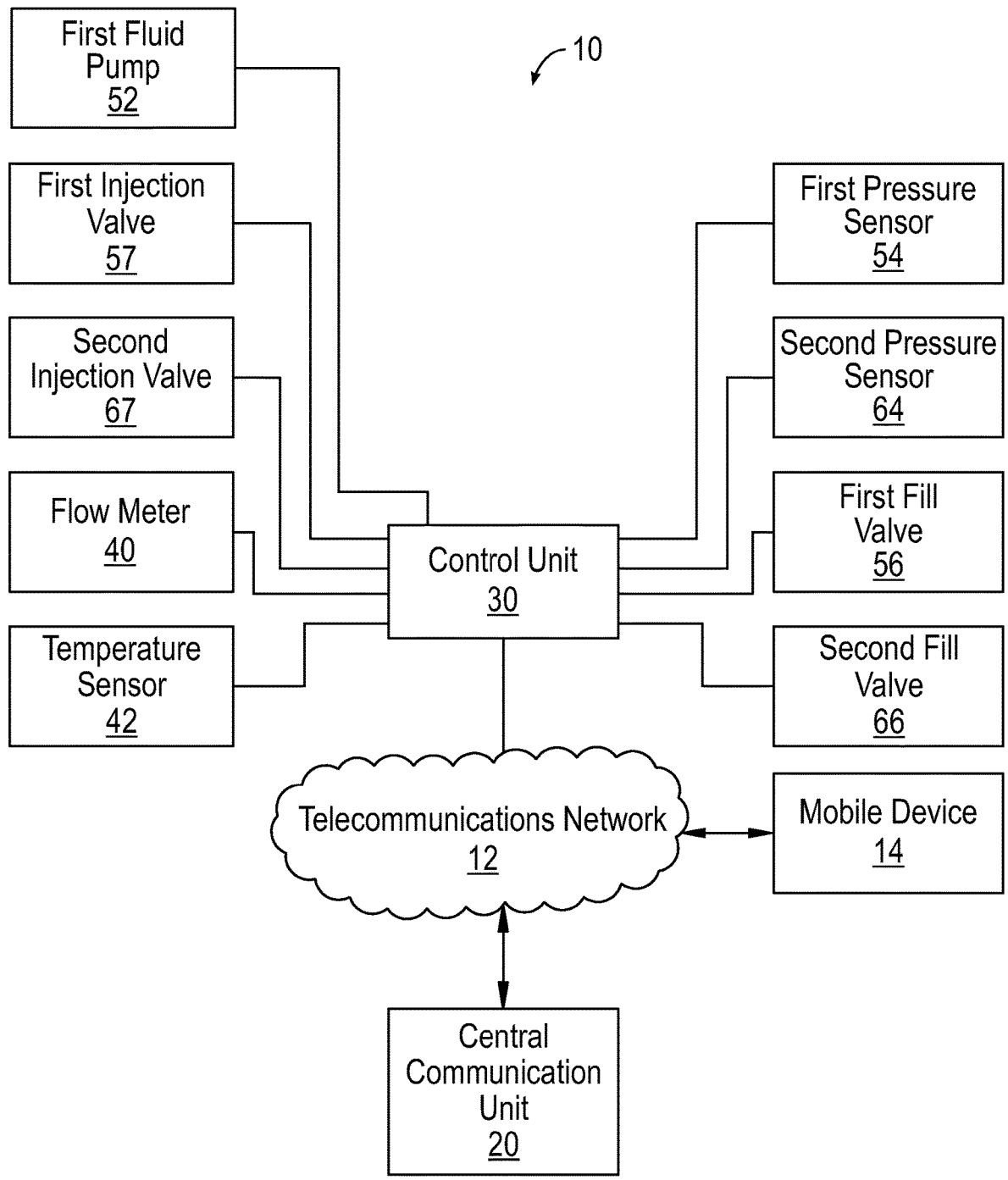
FIG. 1 is a block diagram illustrating the control and communications between the various components of a continuous fluid metering system in accordance with an example embodiment.

A. Overview.

An example continuous fluid metering system 10 generally includes an additive tank 58 adapted to hold a fluid, such as water, a scale inhibitor, a corrosion inhibitor, a desalination chemical and a biocide, to be injected into a fluid injection point, such as an oil well 18. The continuous fluid metering system 10 also includes a first measuring tube 53 and a second measuring tube 63. The first measuring tube 53 and the second measuring tube 63 are fluidly coupled to the additive tank 58 and are adapted to receive the fluid from the additive tank 58 and to dispense the fluid.

The continuous fluid metering system 10 also includes a first fill valve 56 and a second fill valve 66. The first fill valve 56 and the second fill valve 66 are fluidly coupled to the additive tank and to a pump 52 via a first injection valve 57 and a second injection valve 67 respectively. The first fill valve 56 is operable to selectively transfer the fluid from the additive tank 58 to the first measuring tube 53 and the second fill valve 66 is operable to selectively transfer the fluid from the additive tank 58 to the second measuring tube 63. Alternatively, the continuous fluid metering system includes a three-way fill valve 76 in place of the first fill valve 56 and the second fill valve 66. In a first state the three-way fill valve 76 is adapted to transfer the fluid from the additive tank 58 to the first measuring tube 53 and in a second state the three-way fill valve 76 is adapted to transfer the fluid can from the additive tank 58 to the second measuring tube 63.

The first injection valve 57 is fluidly coupled between the first measuring tube 53 and the pump 52 and injection point 18, and the second injection valve 67 is fluidly coupled between the second measuring tube 63 and the pump 52 and injection point 18. The first injection valve 57 is operable to selectively direct the fluid dispensed from the first measuring tube 53 to the fluid injection point 18 and the second injection valve 67 is operable to selectively direct the fluid dispensed from the second measuring tube 63 to the fluid injection point 18. Alternatively, the continuous fluid metering system 10 includes a three-way injection valve 77 in place of the first injection valve 57 and the second injection valve 67. In a first state the three-way injection valve 77 is adapted to direct the fluid dispensed from the first measuring tube 53 to the injection point 18 and in a second state the three-way injection valve 77 is adapted to direct the fluid dispensed from the second measuring tube 63 to the injection point 18.

The continuous fluid metering system 10 also includes a control unit 30, which is in communication with and which is configured to control the first fill valve 56, the second fill valve 66, the first injection valve 57, and the second injection valve 67. Alternatively, the control unit 30 is in communication with and is configured to control the three-way fill valve 76 and the three-way injection valve 77. The control unit 30 also is in communication with a first fluid pressure sensor 54 coupled to the first measuring tube 53, and with a second fluid pressure sensor 64 coupled with the second measuring tube 63. The first fluid pressure sensor 54 and the second fluid pressure sensor 64 are adapted to provide indications of the volume of the fluid in the first measuring tube 53 and the second measuring tube 63 respectively.

The control unit 30 is configured to carry out a continuous dispensing and injection process that includes a plurality of fluid dispensing cycles and a plurality of fluid fill and refill cycles. During the plurality of fluid dispensing cycles, the control unit 30 alternately controls the first injection valve 57 and the second injection valve 67 to alternately direct fluid dispensed from the first measuring tube 53 and the second measuring tube 63 respectively to the injection point continuously and without substantial interruption in flow.

The first injection valve 57 and the second valve 67 each has an open state in which fluid is allowed to flow through the valve and a closed state in which fluid is prevented from flowing through the valve. When the fluid to be directed to the injection point 18 is to be switched between the fluid dispensed from first measuring tube 53 and the fluid dispensed from the second measuring tube 63, the control unit 30 simultaneously controls the first injection valve 57 and the second injection valve 67 and causes them to simultaneously switch between their respective open and closed states, thus enabling the continuous flow of fluid to the injection point without substantial interruption.

Alternatively, the control unit 30 is configured to control the three-way injection valve 77 to alternately place it in the first state to direct the fluid dispensed from the first measuring tube 53 to the injection point 18, and in the second state to direct the fluid dispensed from the second measuring tube 63 to the injection point 18, again so that the fluid dispensed from the first measuring tube 53 and the second measuring tube 63 is directed to the injection point 18 continuously and without substantial interruption in the flow.

During the plurality of fluid fill and refill cycles, the control unit 30 is configured to control the first fill valve 56 to carry out a first initial fill cycle to fill the first measuring tube 53 with the fluid from the additive tank 58 and the second fill valve 66 to carry out a second initial fill cycle to fill the second measuring tube 63 with the fluid from the additive tank 58 prior to initiating the plurality of fluid dispensing cycles. Alternatively, the control unit 30 is configured to place the three-way fill valve 76 in the first state to carry out the first initial fill cycle and in the second state to carry out the second initial fill cycle.

The control unit 30 is configured to carry out the plurality of fluid refill cycles simultaneously with carrying out the plurality of fluid dispensing cycles. During the plurality of fluid refill cycles, the control unit 30 controls the first fill valve 56 and the second fill valve 66 to alternately and repeatedly transfer fluid from the additive tank 58 to the first measuring tube 53 and to the second measuring tube 63 to alternately and repeatedly refill the first measuring tube 53 and the second measuring tube 63 with the fluid from the additive tank 58. Alternatively, the control unit is configured to alternately place the three-way fill valve 76 in the first state and in the second state to carry out the plurality of refill cycles. The plurality of fluid refill cycles are carried out such that while fluid is being dispensed from one measuring tube in a fluid dispensing cycle, fluid is being transferred from the additive tank 58 to the other measuring tube in a refill cycle.

Accordingly, the flow of fluid dispensed from the first measuring tube 53 and the second measuring tube 63 is continuous.

During the course of the continuous dispensing and injection process, the control unit 30 is configured to determine based on the indications of volume provided by the first pressure sensor 54 and the second pressure sensor 64 the volume of the fluid dispensed from the first measuring tube 53 and from the second measuring tube 63 as it is dispensed during each dispensing cycle. Based on that determination, the control unit 30 switches alternately between the first injection valve 57 and the second injection valve 67 to direct the fluid dispensed from the first measuring tube 53 and the second measuring tube 63 for succeeding fluid dispensing cycles. Also, based on that determination, the control unit 30 switches alternately between the first fill valve 56 and the second fill valve 66 to alternately refill the first measuring tube 53 and the second measuring tube 63 with the fluid from the additive tank 58 during succeeding fluid refill cycles. The control unit 30 also is configured to determine the volume of the fluid dispensed during the plurality of fluid dispensing cycles and the volume of the fluid in the additive tank 58.

Accordingly, during the course of the continuous dispensing and injection process, which can continue indefinitely, the fluid is alternately dispensed from the first and second measuring tubes continuously and without substantial interruption in flow, and is directed to the fluid injection point for injection continuously without substantial interruption.

B. Exemplary Telecommunications Networks.

The continuous fluid metering system 10 may be utilized upon any telecommunications network 12 capable of transmitting data including voice data and other types of electronic data. Examples of suitable telecommunications networks 12 for the continuous fluid metering system 10 include but are not limited to global computer networks (e.g. Internet), wireless networks, cellular networks, satellite communications networks, cable communication networks (via a cable modem), microwave communications network, local area networks (LAN), wide area networks (WAN), campus area networks (CAN), metropolitan-area networks (MAN), and home area networks (HAN). The continuous fluid metering system 10 may communicate via a single telecommunications network or multiple telecommunications networks concurrently. Various protocols may be utilized by the electronic devices for communications such as but not limited to HTTP, SMTP, FTP and WAP (wireless Application Protocol). The continuous fluid metering system 10 may be implemented upon various wireless networks such as but not limited to 3G, 4G, LTE, CDPD, CDMA, GSM, PDC, PHS, TDMA, FLEX, REFLEX, IDEN, TETRA, DECT, DATATAC, and MOBITEX. The continuous fluid metering system 10 may also be utilized with online services and internet service providers.

The Internet is an exemplary telecommunications network 12 for the continuous fluid metering system 10. The Internet is comprised of a global computer network having a plurality of computer systems around the world that are in communication with one another. Via the Internet, the computer systems are able to transmit various types of data between one another. The communications between the computer systems may be accomplished via various methods such as but not limited to wireless, Ethernet, cable, direct connection, telephone lines, and satellite.

C. Central Communication Unit.

The central communication unit 20 may be comprised of any central communication site where communications are preferably established with. The central communication units 20 may be comprised of a server computer, cloud based computer, virtual computer, home computer or other computer system capable of receiving and transmitting data via IP networks and the telecommunication networks 12. As can be appreciated, a modem or other communication device may be required between each of the central communication units 20 and the corresponding telecommunication networks 12. The central communication unit 20 may be comprised of any electronic system capable of receiving and transmitting information (e.g. voice data, computer data, etc.).

D. Mobile Device.

The mobile device 14 may be comprised of any type of computer for practicing the various aspects of the continuous fluid metering system 10. For example, the mobile device can be a personal computer (e.g. APPLE® based computer, an IBM based computer, or compatible thereof) or tablet computer (e.g. IPAD®). The mobile device 14 may also be comprised of various other electronic devices capable of sending and receiving electronic data including but not limited to smartphones, mobile phones, telephones, personal digital assistants (PDAs), mobile electronic devices, handheld wireless devices, two-way radios, smart phones, communicators, video viewing units, television units, television receivers, cable television receivers, pagers, communication devices, and digital satellite receiver units.

The mobile device 14 may comprised of any conventional computer. A conventional computer preferably includes a display screen (or monitor), a printer, a hard disk drive, a network interface, and a keyboard. A conventional computer also includes a microprocessor, a memory bus, random access memory (RAM), read only memory (ROM), a peripheral bus, and a keyboard controller. The microprocessor is a general-purpose digital processor that controls the operation of the computer. The microprocessor can be a single-chip processor or implemented with multiple components. Using instructions retrieved from memory, the microprocessor controls the reception and manipulations of input data and the output and display of data on output devices. The memory bus is utilized by the microprocessor to access the RAM and the ROM. RAM is used by microprocessor as a general storage area and as scratch-pad memory, and can also be used to store input data and processed data. ROM can be used to store instructions or program code followed by microprocessor as well as other data. A peripheral bus is used to access the input, output and storage devices used by the computer. In the described embodiments, these devices include a display screen, a printer device, a hard disk drive, and a network interface. A keyboard controller is used to receive input from the keyboard and send decoded symbols for each pressed key to microprocessor over bus. The keyboard is used by a user to input commands and other instructions to the computer system. Other types of user input devices can also be used in conjunction with the continuous fluid metering system 10. For example, pointing devices such as a computer mouse, a track ball, a stylus, or a tablet to manipulate a pointer on a screen of the computer system. The display screen is an output device that displays images of data provided by the microprocessor via the peripheral bus or provided by other components in the computer. The printer device when operating as a printer provides an image on a sheet of paper or a similar surface. The hard disk drive can be utilized to store various types of data. The microprocessor, together with an operating system, operates to execute computer code and produce and use data. The computer code and data may reside on RAM, ROM, or hard disk drive. The computer code and data can also reside on a removable program medium and loaded or installed onto computer system when needed. Removable program mediums include, for example, CD-ROM, PC-CARD, USB drives, floppy disk and magnetic tape. The network interface circuit is utilized to send and receive data over a network connected to other computer systems. An interface card or similar device and appropriate software implemented by microprocessor can be utilized to connect the computer system to an existing network and transfer data according to standard protocols.

E. First Fluid Additive System.

Figure 2:
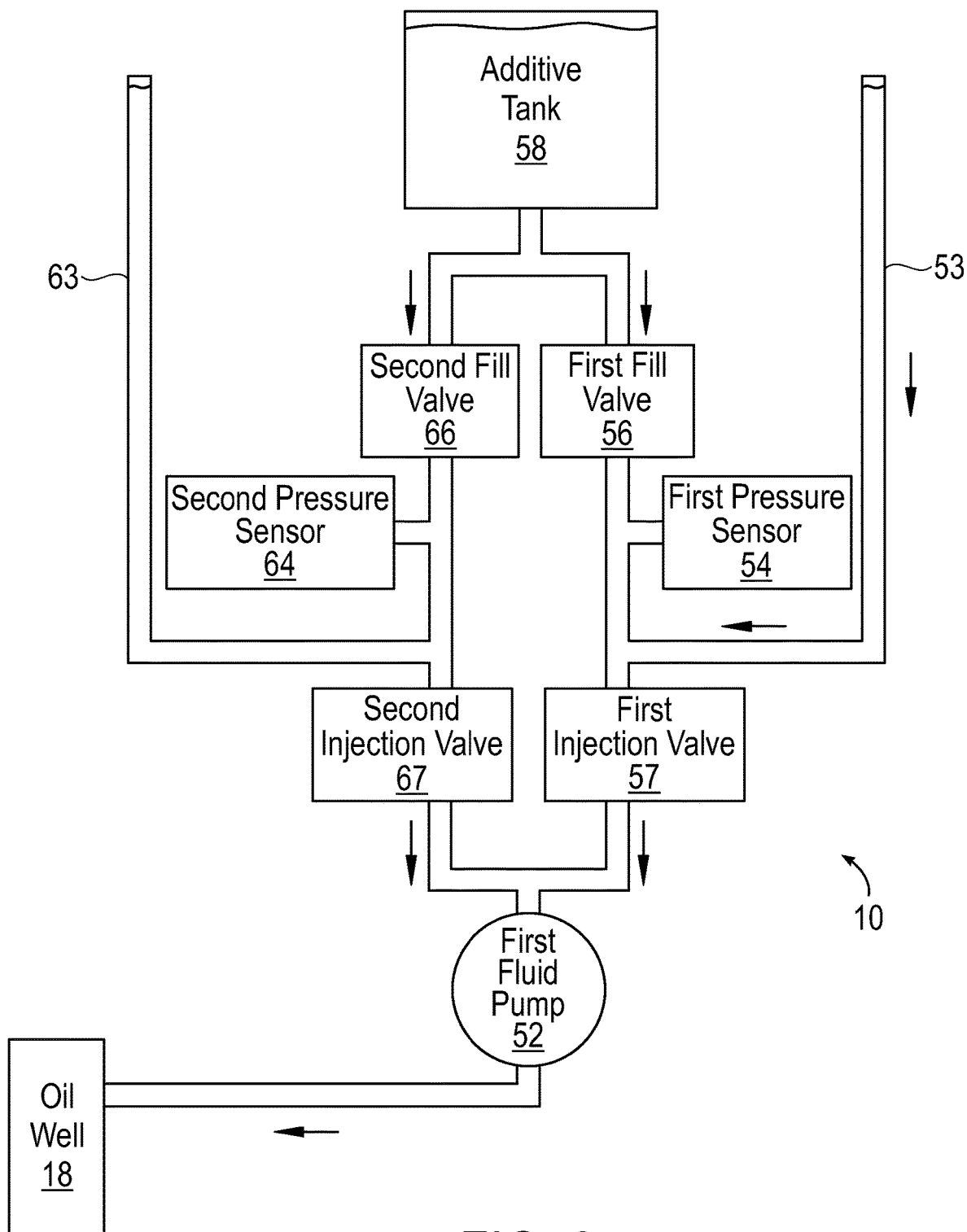
FIG. 2 is a block diagram illustrating the components of a continuous fluid metering system and the flow of fluid between components in accordance with an example embodiment.

FIGS. 1 and 2 illustrate a first example embodiment comprising a first fluid additive system. The first fluid additive system comprises an additive tank 58 capable and adapted for holding a volume of the fluid to be injected into an injection point, which may comprise an oil well 18. The first additive tank 58 may comprise any tank capable of holding and/or storing fluid. The fluid may comprise, for example, a liquid water treatment chemical for treating water prior to or after injection into an oil well 18 such as, but not limited to, a scale inhibitor, a corrosion inhibitor, a desalination chemical and/or a biocide. The fluid may comprise any other additive fluid or mixture or combination of additive fluids. The additive tank 58 may be used for long term storage of the fluid or for temporarily holding the fluid for injection.

The additive tank 58 may comprise a single tank, multiple separate tanks, or multiple tanks in fluid communication via appropriate plumbing. The additive tank 58 may also comprise a single tank with multiple separate compartments or with compartments in fluid communication via appropriate plumbing, or baffles, for example.

The additive tank 58 may be comprised of a stationary tank, a mobile tank, a pressurized fluid source, such as a municipal water supply, or the like. As used herein, "additive tank 58" is not limited to a conventional fluid tank and may be comprised of any device, combination of devices, or system capable of providing fluid for injection by the continuous fluid metering system 10.

The additive tank 58 is fluidly coupled and is in fluid communication with the fluid pump 52 and via the fluid pump 52 with an injection point, such as oil well 18, with the first fill valve 56 and the first injection valve 57 fluidly coupled inline between thereof as shown in FIG. 2 of the drawings. The first fill valve 56 and the first injection valve 57 selectively isolate the additive tank 58 from the fluid pump 52 to allow for filling and refilling the first measuring tube 53 with fluid from the additive tank 58 and for selectively dispensing the fluid from the first measuring tube 53 for injection to the injection point.

As further shown in FIG. 2, the first measuring tube 53 is fluidly coupled and in fluid communication with the additive tank 58. The first measuring tube 53 is adapted to receive the fluid from the additive tank 58 and to dispense the fluid. The first fill valve 56 is fluidly coupled between the first measuring tube 53 and the additive tank 58 to allow for isolation of the fluid within the first measuring tube 53 after being filled or refilled and during dispensing of the fluid from the first measuring tube 53 to the injection point through the first injection valve 57 and fluid pump 52.

In the example embodiment illustrated in FIG. 2 of the drawings, the first measuring tube 53 may be shaped as a cylindrical tube and arranged in an upright or substantially upright orientation. The first measuring tube 53 preferably comprises an upwardly angled tube and is preferably substantially vertically orientated. The first measuring tube 53 may be as described in U.S. Pat. No. 10,144,653, which is assigned to the assignee of the present application, particularly as described at Col. 6, lines 32-34 and lines 40-58. That '653 patent is hereby incorporated by reference.

The first measuring tube 53 preferably is fluidly coupled and in fluid communication with the additive tank 58 such that when the first fill valve 56 is opened, and the first measuring tube 53 is isolated from fluid pump 52 and the injection point, the fluid within the first measuring tube 53 will assume approximately the same level as the fluid within the additive tank 58 as illustrated in FIG. 2 of the drawings. This can be accomplished by allowing the first measuring tube 53 to be filled with fluid from the additive tank 58 under the force of gravity. If desired, however, various other means such as a pump may be used to direct the fluid from the additive tank 58 through the first fill valve 56 to the first measuring tube 53.

In the example embodiments, the first measuring tube 53 preferably comprises a small width tube. The first measuring tube 53 may have various internal cross-sectional shapes for the internal passage such as circular, square, rectangular, oval and the like. However, it is preferable that the first measuring tube 53 is comprised of a constant interior cross-sectional shape and more preferably is comprised of a circular interior shape to provide for relatively simple calculation of the volume of fluid within the first measuring tube 53. In the example embodiments, the first measuring tube 53 preferably has an interior width of less than 0.5 inches and has a vertical length of at least 2 feet. The first measuring tube 53 further preferably has a circular cross-sectional shape, an interior diameter of approximately 0.375 inches and a vertical length of approximately 3 feet. The small diameter of the first measuring tube 53 combined with the long length of the tube allows for accurate measurement of the fluid within the first measuring tube 53 after filling or refilling the first measuring tube 53 and after dispensing the fluid from the first measuring tube 53. The dimensions of the first measuring tube 53 can be adjusted to accommodate different volumes of fluid required to be metered or dispensed.

The first fill valve 56 is fluidly coupled between the additive tank 58 and the first measuring tube 53 as shown in FIG. 2. The first fill valve 56 is adapted and operable to selectively transfer the fluid from the additive tank 58 to the first measuring tube 53 for filling and refilling the first measuring tube 53.

The first injection valve 57 is fluidly coupled between the first measuring tube 53 and the fluid pump 52 and via the fluid pump 52 between the first measuring tube 53 and the injection point, such as oil well 18, as further shown in FIG. 2. The first injection valve 57 is adapted and operable to selectively direct the fluid dispensed from the first measuring tube 53 to the injection point 18. The first injection valve 57 may be arranged to direct the fluid directly to the injection point 18 as illustrated in FIG. 2, or may be arranged to direct the fluid to be mixed with a carrier fluid such as water before the mixture is directed to the injection point 18.

The first fill valve 56 and the first injection valve 57 may be comprised of any electronic valve electrically controllable by the control unit 30 or another controller. The first fill valve 56 and the first injection valve 57 each is selectively operable to assume an open state in which fluid is allowed to flow through the valve between an inlet port and an outlet port, and a closed state in which fluid is prevented from flowing through the valve between the inlet and outlet ports. The first fill valve 56 and the first injection valve 57 may be and preferably are independently controlled by the control unit 30. Further, the first fill valve 56 and the first injection valve 57 may be and preferably are separately and independently controlled from the second fill valve 66 and the second injection valve 67 described below.

A first sensor 54 is fluidly coupled to the first measuring tube 53 and is adapted and operable to provide an indication of the volume of the fluid in the first measuring tube 53 before and after the fluid is dispensed from the first measuring tube 53. The first sensor 54 is further adapted and operable to provide an indication of the volume of the fluid in the first measuring tube 53 as the fluid is being dispensed.

The first sensor 54 preferably comprises a first pressure sensor 54 that measures a first pressure of the fluid within the first measuring tube 53. The level of the fluid in a measuring tube may be derived from the pressure that the fluid in the measuring tube exerts on a pressure sensor. Thus, the level of the fluid in the first measuring tube 53 may be determined from the pressure that the fluid in the first measuring tube 53 exerts on the first pressure sensor 54. In turn, the level of the fluid in the first measuring tube 53 provides an indication of the volume of the fluid in the first measuring tube 53. The volume of the fluid in the first measuring tube 53 may be derived by formula from the level of the fluid in the first measuring tube 53, the known dimensions of the measuring tube, and the known properties of the fluid, including for example the density and temperature of the fluid.

Although the first sensor 54 is preferably a pressure sensor, those skilled in the art will appreciate that other types of sensors are also operable to provide an indication of the volume of fluid in a tube and may be used in place of or in addition to the first pressure sensor 54. Such sensors may include, for example, optical sensors, capacitive sensors, and various types of mechanical sensors.

The first sensor 54 is in communication with the control unit 30 and is adapted and operable to transmit or otherwise provide to the control unit 30 the indication of the fluid level or volume within the first measuring tube 53 periodically, continuously and/or upon request of the control unit 30. The first pressure sensor 54 is preferably fluidly connected to a bottom, a lower portion or below the first measuring tube 53 to acquire an accurate reading of the total level or volume of the fluid within the first measuring tube 53.

F. Second Fluid Additive System.

FIGS. 1 and 2 illustrate a first example embodiment comprising a second fluid additive system. The second fluid additive system comprises the additive tank 58, a second fill valve 66, a second measuring tube 63, a second sensor 64, and a second injection valve 67, and the pump 52.

In the example embodiments, the components of the second fluid additive system are arranged and intercoupled substantially the same as the components of the first fluid additive system described above and illustrated in FIG. 2. However, persons skilled in the art will appreciate that it is not necessary that the second fluid additive system be substantially the same as the first fluid additive system, that the components of the second fluid additive system may differ from the components of the first fluid additive system, and that the arrangement and intercoupling of the components of the second fluid additive system may differ from the first fluid additive system. For example, as shown and described in U.S. Pat. No. 10,144,653, which is assigned to the assignee of this application and which is incorporated herein by reference, the second fluid additive system may comprise a second additive tank that holds a different additive fluid than additive tank 58 and that is to be dispensed and injected by the second fluid additive system.

In the example embodiment illustrated in FIG. 2, however, the additive tank 58 is fluidly coupled to the fluid pump 52 and via the fluid pump 52 with an injection point, such as oil well 18, with the second fill valve 66 and the second injection valve 67 fluidly coupled inline between thereof. The second fill valve 66 and the second injection valve 67 selectively isolate the additive tank 58 from the fluid pump 52 to allow for filling and refilling the second measuring tube 63 with fluid from the additive tank 58 and for selectively dispensing the fluid from the second measuring tube 63 for injection to the injection point.

As further shown in FIG. 2, the second measuring tube 63 is fluidly coupled and in fluid communication with the additive tank 58. The second measuring tube 63 is adapted to receive the fluid from the additive tank 58 and to dispense the fluid. The second fill valve 66 is fluidly coupled between the second measuring tube 63 and the additive tank 58 to allow for isolation of the fluid within the second measuring tube 63 after being filled or refilled and during dispensing of the fluid from the second measuring tube 63 to the injection point through the second injection valve 67 and fluid pump 52.

In the example embodiments, the second measuring tube 63 preferably is substantially the same as the first measuring tube 53. However, as noted above that is not a necessity.

The second measuring tube 63 is fluidly coupled to and in fluid communication with the additive tank 58 such that when the second fill valve 66 is opened, and the second measuring tube 63 is isolated from fluid pump 52 and the injection point, the fluid within the second measuring tube 63 will assume approximately the same level as the fluid within the additive tank 58 as illustrated in FIG. 2. This can be accomplished by allowing the second measuring tube 63 to be filled with fluid from the additive tank 58 under the force of gravity. If desired, however, various other means such as a pump may be used to direct the fluid from the additive tank 58 through the second fill valve 66 to the second measuring tube 63.

The second fill valve 66 is fluidly coupled between the additive tank 58 and the second measuring tube 63 as shown in FIG. 2. The second fill valve 66 is adapted and operable to selectively transfer the fluid from the additive tank 58 to the second measuring tube 63 for filling and refilling the second measuring tube 63.

The second injection valve 67 is fluidly coupled between the second measuring tube 63 and the fluid pump 52 and via the fluid pump 52 between the second measuring tube 63 and the injection point, such as oil well 18, as further shown in FIG. 2. The second injection valve 67 is adapted and operable to selectively direct the fluid dispensed from the second measuring tube 63 to the injection point 18. The second injection valve 67 may be arranged to direct the fluid directly to the injection point 18 as illustrated in FIG. 2, or may be arranged to direct the fluid to be mixed with a carrier fluid such as water before the mixture is directed to the injection point 18.

The second fill valve 66 and the second injection valve 67 may be comprised of any electronic valve electrically controllable by the control unit 30. The second fill valve 66 and the second injection valve 67 each is selectively operable to assume an open state in which fluid is allowed to flow through the valve between an inlet port and an outlet port, and a closed state in which fluid is prevented from flowing through the valve between the inlet and outlet ports. The second fill valve 66 and the second injection valve 67 may be and preferably are independently controlled by the control unit 30. Further, the second fill valve 66 and the second injection valve 67 may be and preferably are separately and independently controlled from the first fill valve 56 and the first injection valve 57 described above.

A second sensor 64 is fluidly coupled to the second measuring tube 63 and is adapted and operable to provide an indication of the volume of the fluid in the second measuring tube 63 before and after the fluid is dispensed from the second measuring tube 63. The second sensor 64 is further adapted and operable to provide an indication of the volume of the fluid in the second measuring tube 63 as the fluid is being dispensed. Preferably, the second sensor 64 comprises a second pressure sensor 64 that measures a second pressure of the fluid within the second measuring tube 63 as an indication of the level of the fluid in the second measuring tube 63. However, the second pressure sensor 64 may be a different type of sensor as described above with respect to the first sensor 54. Also preferably, but not necessarily, the second sensor 64 is substantially the same as the first sensor 54.

The second sensor 64 is in communication with the control unit 30 and is adapted and operable to transmit or otherwise provide to the control unit 30 the indication of the fluid level or volume within the second measuring tube 63 periodically, continuously and/or upon request of the control unit 30. The second pressure sensor 64 is preferably fluidly connected to a bottom, a lower portion or below the second measuring tube 63 to acquire an accurate reading of the total level or volume of the fluid within the second measuring tube 63.

G. Alternative First and Second Fluid Additive Systems.

Figure 4:
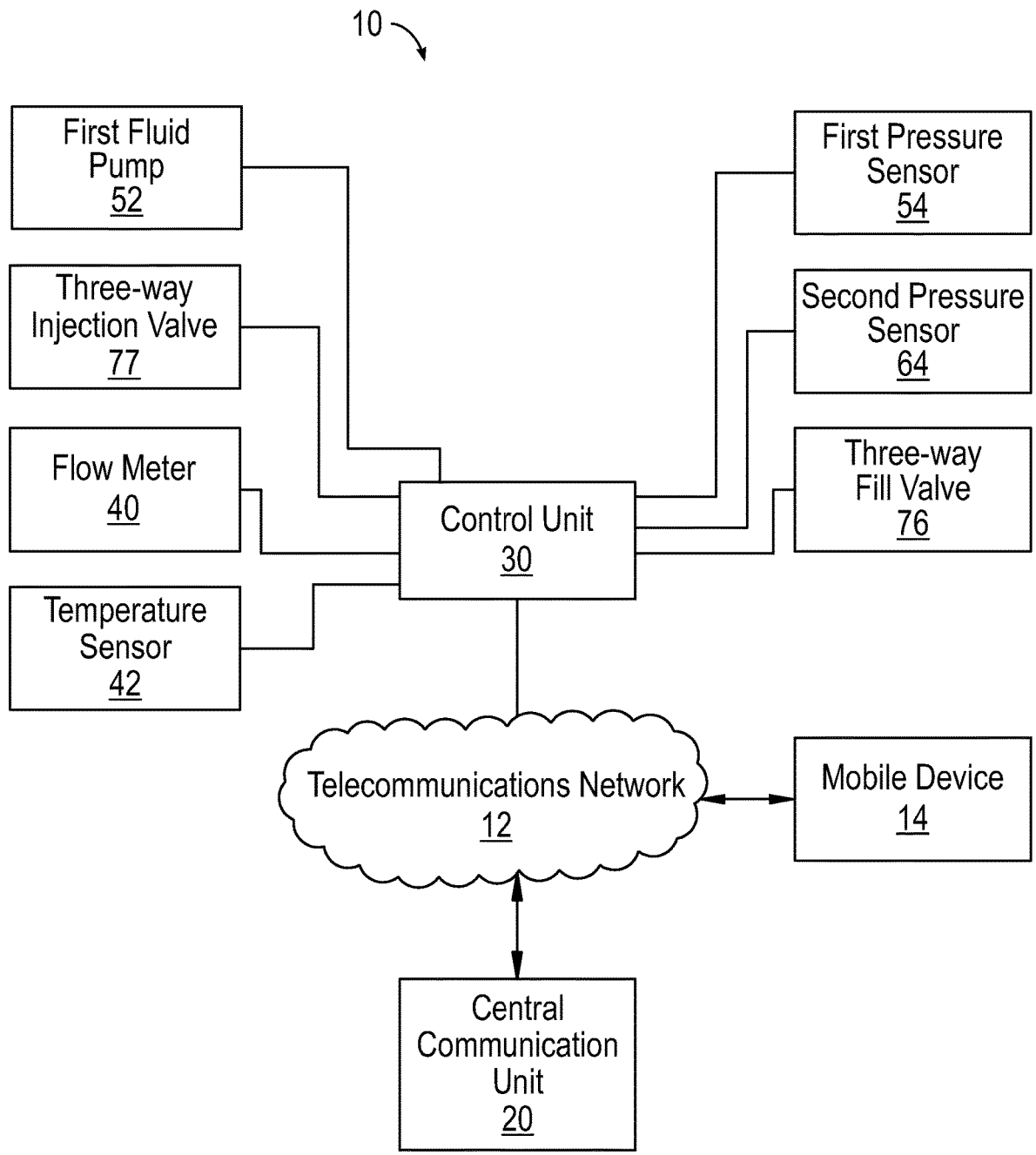
FIG. 4 is a block diagram illustrating the control and communications between the various components of a continuous fluid metering system in accordance with an alternative example embodiment.
Figure 5:
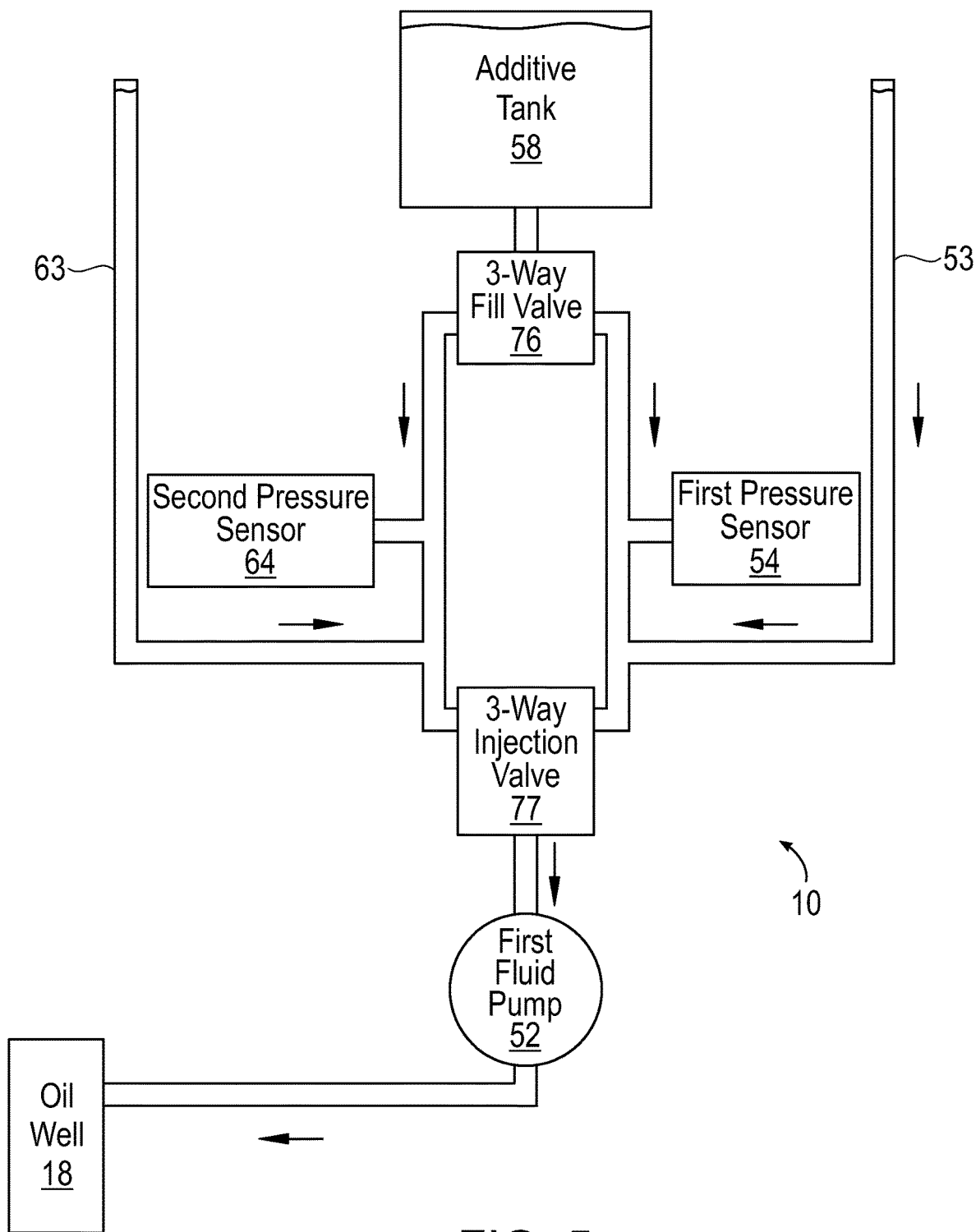
FIG. 5 is a block diagram illustrating the components of a continuous fluid metering system and the flow of fluid between components in accordance with an alternative example embodiment.

FIGS. 4 and 5 illustrate an alternative example embodiment comprising an alternative first fluid additive system and an alternative second fluid additive system. In the alternative example embodiment, the components comprising the alternative first fluid additive system are substantially the same as, are intercoupled in substantially the same way as, and function substantially the same as the components of the first fluid additive system described above, except that the first fill valve 56 is replaced by a three-way fill valve 76 and the first injection valve 57 is replaced by a three-way injection valve 77. Similarly, the components comprising the alternative second fluid additive system are substantially the same as, are intercoupled in substantially the same way as, and function substantially the same as the components of the second fluid additive system described above, except that the second fill valve 66 is replaced by the three-way fill valve 76 and the second injection valve 67 is replaced by the three-way injection valve 77. In other words, the alternative first fluid additive system and the alternative second fluid additive system share the three-way fill valve 76 and the three-way injection valve 77 in common rather than the alternative first fluid additive system having its own first fill valve 56 and first injection valve 57, and the alternative second fluid additive system having its own second fill valve 66 and second injection valve 67.

In the alternative example embodiment, the additive tank 58 is fluidly coupled and is in fluid communication with the fluid pump 52 and via the fluid pump 52 with an injection point, such as oil well 18, with the three-way fill valve 76 and the three-way injection valve 77 fluidly coupled inline between thereof. The three-way fill valve 76 and the three-way injection valve 77 selectively isolate the additive tank 58 from the fluid pump 52 to allow for selectively filling and refilling the first measuring tube 53 and the second measuring tube 63 with fluid from the additive tank 58 and for selectively dispensing the fluid from the first measuring tube 53 and from the second measuring tube 63 for injection to the injection point.

As further shown in FIG. 5, the first measuring tube 53 is fluidly coupled to and in fluid communication with the additive tank 58, and the three-way fill valve 76 is fluidly coupled between the first measuring tube 53 and the additive tank 58 to allow for isolation of the fluid within the first measuring tube 53 after being filled or refilled and during dispensing of the fluid from the second measuring tube 53 to the injection point through the three-way injection valve 77 and fluid pump 52.

Similarly, the second measuring tube 63 is fluidly coupled to and in fluid communication with the additive tank 58, and the three-way fill valve 76 is fluidly coupled between the second measuring tube 63 and the additive tank 58 to allow for isolation of the fluid within the second measuring tube 63 after being filled or refilled and during dispensing of the fluid from the second measuring tube 63 to the injection point through the three-way injection valve 77 and fluid pump 52.

The first measuring tube 53 is fluidly connected to the additive tank 58 such that when the three-way fill valve 76 is in a state in which the fluid is allowed to flow from the additive tank 58 to the first measuring tube 53, and the first measuring tube 53 is isolated from fluid pump 52 and the injection point, the fluid within the first measuring tube 53 will assume approximately the same level as the fluid within the additive tank 58 in the same manner previously described with respect to the first fluid additive system of the example embodiment illustrated in FIG. 2.

Similarly, the second measuring tube 63 is fluidly connected to the additive tank 58 such that when the three-way fill valve 76 is in a state in which the fluid is allowed to flow from the additive tank 58 to the second measuring tube 63, and the second measuring tube 63 is isolated from fluid pump 52 and the injection point, the fluid within the second measuring tube 63 will assume approximately the same level as the fluid within the additive tank 58 in the same manner previously described with respect to the second fluid additive system of the example embodiment illustrated in FIG. 2.

The three-way fill valve 76 is fluidly coupled between and in fluid communication with the additive tank 58 and the first measuring tube 53, and the three-way injection valve 77 is fluidly coupled between and in fluid communication with the first measuring tube 53 and the fluid pump 52 and via the fluid pump 52 between the first measuring tube 53 and the injection point, such as oil well 18, as further shown in FIG. 5. Similarly, the three-way fill valve 76 is fluidly coupled between and in fluid communication with the additive tank 58 and the second measuring tube 63 and the three-way injection valve 77 is fluidly coupled between and in fluid communication with the second measuring tube 63 and the fluid pump 52 and via the fluid pump 52 between the second measuring tube 63 and the injection point, such as oil well 18, as further shown in FIG. 5.

The three-way fill valve 76 has a first port fluidly coupled to and in fluid communication with the first measuring tube 53, a second port fluidly coupled to and in fluid communication with the second measuring tube 63, and a third port fluidly coupled to and in fluid communication with the additive tank 58.

The three-way fill valve 76 is selectively operable to assume a first state in which fluid is allowed to flow through the valve between the third port, i.e., the additive tank 58, and the first port, i.e., the first measuring tube 53, and a second state in which fluid is allowed to flow between the third port, i.e., the additive tank 58, and the second port, i.e., the second measuring tube 63. Thus, the three-way fill valve 76 is selectively operable when in the first state to transfer the fluid from the additive tank 58 to the first measuring tube 53 to fill or refill the first measuring tube 53 with fluid from the additive tank 58. Similarly, the three-way fill valve 76 is selectively operable when in the second state to transfer the fluid from the additive tank 58 to the second measuring tube 63 fill or refill the second measuring tube 63 with fluid from the additive tank 58.

The three-way injection valve 77 has a first port fluidly coupled to and in fluid communication with the first measuring tube 53, a second port fluidly coupled to and in fluid communication with the second measuring tube 63, and a third port fluidly coupled to and in fluid communication with the fluid pump 52 and via the fluid pump 52 with the injection point 18.

The three-way injection valve 77 is selectively operable to assume a first state in which fluid is allowed to flow through the valve between the first port, i.e., the first measuring tube 53, and the third port, i.e., the fluid pump 52, and a second state in which fluid is allowed to flow between the second port, i.e., the second measuring tube 63, and the third port, i.e., the fluid pump 52. Thus, the three-way injection valve 77 is adapted when in the first state to direct the fluid dispensed from the first measuring tube 53 to the fluid pump 52 for injection at the injection point, and is adapted when in the second state to direct or transfer the fluid dispensed from the second measuring tube 63 to the fluid pump 52 for injection at the injection point 18.

The three-way fill valve 76 and the three-way injection valve 77 may be comprised of any three-port electronic valve electrically controllable by the control unit 30 or another controller. The three-way fill valve 76 and the three-way injection valve 77 may be and preferably are independently and substantially simultaneously controlled by the control unit 30.

It will be appreciated by persons skilled in the art that while the alternative example embodiment illustrated in FIGS. 4 and 5 comprises both a shared three-way fill valve 76 and a shared three-way injection valve 77, either of the shared valves may be replaced by separate valves dedicated to the first fluid additive system and the second fluid additive system respectively. In other words, the first fluid additive system and the second fluid additive system could share the three-way fill valve 76 but have separate first and second injection valves 57, 67 as in the example embodiment illustrated in FIG. 2 and described above. Similarly, the first fluid additive system and the second fluid additive system could share the three-way injection valve 77 but have separate first and second fill valves 56, 66 as in the example embodiment illustrated in FIG. 2 and described above.

H. Fluid Pump.

In both the example embodiment illustrated in FIGS. 1-2 and the alternative example embodiment illustrated in FIGS. 4-5, the fluid pump 52 is fluidly coupled to and between and is in fluid communication with the first measuring tube 53 and the injection point, e.g., oil well 18, and is selectively operable to pump the fluid dispensed by the first measuring tube 53 to the injection point. Similarly, the fluid pump 52 is fluidly coupled to and between and is in fluid communication with the second measuring tube 63 and the injection point, e.g., oil well 18, and is selectively operable to pump the fluid dispensed by the second measuring tube 63 to the injection point.

More specifically, in the example embodiment illustrated in FIGS. 1-2, the fluid pump 52 is fluidly coupled to and is in fluid communication with the injection point 18, the first injection valve 57 and via the first injection valve 57 the first measuring tube 53. Similarly, the fluid pump 52 is fluidly coupled to and is in fluid communication with the injection point 18, the second injection valve 67, and via the second injection valve 67 the second measuring tube 63. Still more specifically, the fluid pump 52 has an inlet port and an outlet port. In this embodiment, the inlet port of the fluid pump 52 is fluidly coupled to the outlet ports of the first injection valve 57 and the second injection valve 67, and the outlet port of the fluid pump 52 is fluidly coupled to the injection point 18. In this embodiment, the fluid pump 52 is operable to pump the fluid dispensed from the first measuring tube 53 through the first injection valve 57 when in its open state to the injection point 18 and is operable to pump the fluid dispensed from the second measuring tube 63 through the second injection valve 67 when in its open state to the injection point 18.

In the alternative example embodiment illustrated in FIGS. 4-5, the fluid pump 52 is fluidly coupled to and is in fluid communication with the injection point 18, three-way injection valve 77, and via the three-way injection valve 77 with both the first measuring tube 53 and the second measuring tube 63. More specifically, the inlet port of the fluid pump 52 is fluidly coupled to the third port of the three-way injection valve 77 and the outlet port is fluidly coupled to the injection point 18. In this embodiment, the fluid pump 52 is operable to pump the fluid dispensed from the first measuring tube 53 through the three-way injection valve 77 in the first state to the injection point 18 and is operable to pump the fluid dispensed from the second measuring tube 63 through the three-way injection valve 77 in the second state to the injection point 18.

The pump 52 need not be a conventional pump and may be comprised of any device capable and adapted to move a volume of the fluid from the first measuring tube 53 and the second measuring tube 63 to and through the first injection valve 57, the second injection valve 67, and the three-way injection valve 77 to the injection point 18 for injection consistent with the objectives described herein. In addition, although FIGS. 2 and 5 show a single pump 52 for illustrative purposes, those skilled in the art will appreciate that a plurality of pumps arranged in series, in parallel, or a combination of both may be employed as pump 52.

In the example embodiments, the fluid pump 52 is in communication with the control unit 30 and may be electronically controlled by the control unit 30 or another control device.

As is well known in the oil industry, fluid, such as the fluid dispensed by the first measuring tube 53 and the second measuring tube 63, may be directly injected at an injection point, such as oil well 18, or may be mixed with a carrier fluid such as water first and the mixture then injected. Thus, persons skilled in the art will appreciate that while the example embodiments illustrated and described herein demonstrate direct injection of the fluid dispensed by the first measuring tube 53 and the second measuring tube 63 into the oil well 18 or other injection point, the fluid dispensed by either or both of the first measuring tube 53 and the second measuring tube 63 may be injected into a carrier fluid such as water first and the mixture then pumped by pump 52 into the oil well 18 or other injection point as illustrated and described in various embodiments of U.S. Pat. No. 10,144, 653, which has been incorporated herein by reference. Moreover, as mentioned previously, the fluid dispensed by the first measuring tube 53 and the second measuring tube 63 need not be the same fluid and two or even more different fluids can be dispensed and pumped to the injection point 18 for injection either directly or mixed with one or more carrier fluids in one or more different ratios if desired.

I. Control Unit.

The control unit 30 may be comprised of any type of computer for practicing the various aspects of the multi-port injection system. For example, the control unit 30 can be a personal computer (e.g. APPLE® based computer, an IBM based computer, or compatible thereof) or tablet computer (e.g. IPAD®). The control unit 30 may also be comprised of various other electronic devices capable of sending and receiving electronic data including but not limited to smartphones, mobile phones, telephones, personal digital assistants (PDAs), mobile electronic devices, handheld wireless devices, two-way radios, smart phones, communicators, video viewing units, television units, television receivers, cable television receivers, pagers, communication devices, and digital satellite receiver units. Further, the control unit 30 may comprise one or more microcontrollers, digital, analog, or mixed circuits, software, firmware, and internal or external configuration elements, such as programming, code, macros, and the like.

The control unit 30 is in communication with the components of the first fluid additive system and the second fluid additive system identified and described above. More specifically, in the example embodiment illustrated in FIGS. 1-2 and described above, the control unit 30 is in communication with the first fill valve 56, the first injection valve 57, and the first sensor 54 of the first fluid additive system, and with the second fill valve 66, the second injection valve 67, and the second sensor 64 of the second fluid additive system, as well as the fluid pump 52. In the alternative example embodiment illustrated in FIGS. 4-5 and described above, control unit 30 is in communication with the various components of the first fluid additive system and the second fluid additive system as identified above, except that instead of the first fill valve 56 and the second fill valve 66, the control unit 30 is in communication with the three-way fill valve 76, and instead of the first injection valve 57 and second injection valve 67, the control unit 30 is in communication with the three-way injection valve 77. In both example embodiments, the control unit 30 may also be in communication with a flow meter 40 and with a temperature sensor 42 for purposes described further below.

The control unit 30 is configured to communicate with and to control the operation of the components of the first fluid additive system, the second fluid additive system, and the pump 52 to carry out a continuous fluid dispensing and injection process. The continuous fluid dispensing and injection process comprises a plurality of fluid dispensing cycles. More specifically, the plurality of fluid dispensing cycles comprise a first initial dispensing cycle, a second initial dispensing cycle, a first plurality of subsequent dispensing cycles, and a second plurality of subsequent dispensing cycles.

With respect to the embodiment illustrated in FIG. 2, the control unit 30 is configured to control the first injection valve 57 and the second injection valve 67 to carry out the plurality of fluid dispensing cycles. In this embodiment, during the plurality of fluid dispensing cycles, the control unit 30 controls the first injection valve 57 and the second injection valve 67 to cause fluid alternately to be dispensed from the first measuring tube 53 and directed to the injection point 18 by the first injection valve 57, and to be dispensed from the second measuring tube 63 and directed by the second injection valve 67 to the injection point 18.

The control unit 30 places the first injection valve 57 in the open state to direct the fluid from the first measuring tube 53 to the injection point 18 and places the first injection valve 57 in the closed state to prevent it from directing the fluid from the first measuring tube 53 to the injection point 18. Similarly, the control unit 30 places the second injection valve 67 in the open state to direct the fluid from the second measuring tube 63 to the injection point 18 and places the second injection valve 67 in the closed state to prevent it from directing the fluid from the second measuring tube 63 to the injection point 18.

The control unit 30 is configured to control the first injection valve 57 and the second injection valve 67 to alternately place the valves in their respective open and closed states simultaneously or substantially simultaneously. Accordingly, the fluid dispensed from the first measuring tube 53 and the fluid dispensed from the second measuring tube 63 is directed to and provided at the injection point 18 substantially continuously and without substantial interruption in flow.

The first time the control unit 30 controls the first injection valve 57 to direct fluid dispensed from the first measuring tube 53 to the injection point 18 comprises the first initial dispensing cycle. During the first initial dispensing cycle, the fluid dispensed by the first measuring tube 53 is the fluid transferred from the additive tank 58 to the first measuring tube 53 during the first initial fill cycle described further below.

Subsequently, each time the control unit 30 controls the first injection valve 57 to direct the fluid dispensed from the first measuring tube 53 to the injection point 18 comprises a subsequent dispensing cycle of the first plurality of subsequent dispensing cycles. During each subsequent dispensing cycle, the fluid dispensed by the first measuring tube 53 is the fluid transferred to the first measuring tube 53 during a subsequent fill cycle of the first plurality of subsequent fill cycles, which is described further below.

Similarly, the first time the control unit 30 controls the second injection valve 67 to direct fluid dispensed from the second measuring tube 63 to the injection point 18 comprises the second initial dispensing cycle. During the second initial dispensing cycle, the fluid dispensed by the second measuring tube 63 is the fluid transferred from the additive tank 58 to the second measuring tube 63 during the second initial fill cycle described further below.

Subsequently, each time the control unit 30 controls the second injection valve 67 to direct the fluid dispensed from the second measuring tube 63 to the injection point 18 comprises a subsequent dispensing cycle of the second plurality of subsequent dispensing cycles. During each subsequent dispensing cycle, the fluid dispensed by the second measuring tube 63 is the fluid transferred to the second measuring tube 63 during a subsequent fill cycle of the second plurality of subsequent fill cycles, which is described further below.

With respect to the embodiment illustrated in FIG. 5, the control unit 30 is configured to control the three-way injection valve 77 by alternately placing it in the first state and the second state to carry out the plurality of fluid dispensing cycles. In this embodiment, during the plurality of fluid dispensing cycles, the control unit 30 controls the three-way injection valve 77 alternately to be in the first state wherein the fluid dispensed from the first measuring tube 53 is directed to the injection point 18 by the three-way injection valve 77, and in the second state wherein the fluid dispensed from the second measuring tube 63 is directed to the injection point 18 by the three-way injection valve 77. Thus, during the first initial dispensing cycle and each subsequent injection cycle of the first plurality of dispensing cycles, the control unit 30 controls the three-way injection valve 77 to be in the first state. Similarly, during the second initial dispensing cycle and each subsequent injection cycle of the second plurality of dispensing cycles, the control unit 30 controls the three-way injection valve 77 to be in the second state. Accordingly, the fluid dispensed by the first measuring tube 53 and the fluid dispensed by the second measuring tube 63 is directed to and provided at the injection point substantially continuously during the plurality of fluid dispensing cycles.

Thus, in the first initial dispensing cycle and each subsequent dispensing cycle of the first plurality of subsequent dispensing cycles, the fluid is dispensed from the first measuring tube 53 and is directed to the injection point 18 by the first injection valve 57 or the three-way injection valve 77 in the first state. In the second initial dispensing cycle and each subsequent dispensing cycle of the second plurality of subsequent dispensing cycles, the fluid is dispensed from the second measuring tube 63 and is directed to the injection point 18 by the second injection valve 67 or the three-way injection valve 77 in the second state. The control unit 30 is configured to control the first injection valve 57 and the second injection valve 67, or the three-way injection valve 77, and the pump 52 to alternately carry out the first initial dispensing cycle and the second initial dispensing cycle, and to thereafter alternately carry out each subsequent dispensing cycle of the first plurality of subsequent dispensing cycles and each subsequent dispensing cycle of the second plurality of subsequent dispensing cycles to dispense and direct the fluid to the injection point substantially continuously and without substantial interruption in the flow of the fluid.

The continuous fluid dispensing and injection process also comprises a plurality of fluid fill cycles and fluid refill cycles. More specifically, the plurality of fluid fill cycles and fluid refill cycles comprise a first initial fill cycle, a second initial fill cycle, a first plurality of subsequent refill cycles, and a second plurality of subsequent refill cycles.

Each of the initial fluid fill cycles and subsequent fluid refill cycles may be set to last a specific period of time deemed sufficient to fill or refill the first measuring tube 53 and/or the second measuring tube 63 to a desired level or volume, for example to the same level as the additive tank 58, or to a preset level value such as approximately 4 cubic inches. The level in the measuring tubes may be determined for example from the indications of volume of fluid in the first measuring tube 53 and the second measuring tube 63 provided by the first sensor 54 and the second sensor 65. The values of the desired level or volume of fluid to which the first measuring tube 53 and the second measuring tube 63 are to be initially filled and subsequently refilled may be dependent on the level of the fluid in the additive tank 58, or may be hard-coded in the system or entered by an operator. The duration of the time and/or the desired level or volume may vary from cycle to cycle and may vary between the first measuring tube 53 and the second measuring tube 63 as fluid is transferred from the holding tank 58 to the first measuring tube 53 and the second measuring tube 63 to carry out the plurality of fluid dispensing cycles comprising the continuous fluid dispensing and injection process.

With respect to the embodiment illustrated in FIG. 2, the control unit 30 is configured to control the first fill valve 56 and the second fill valve 66 to carry out the plurality of fluid fill cycles and refill cycles. More specifically, the control unit 30 is configured to control the first fill valve 56 to carry out the first initial fill cycle. In the first initial fill cycle, the fluid is transferred from the additive tank 58 to the first measuring tube 53 by the first fill valve 56 to fill the first measuring tube 53 with the fluid for the first time before the control unit 30 carries out the plurality of fluid dispensing cycles. Still more specifically, during the first initial fill cycle, the fluid is transferred from the additive tank 58 to fill the first measuring tube 53 with the fluid to be dispensing during the first initial fluid dispensing cycle described above. The control unit 30 places the first fill valve 56 in the open state to transfer the fluid from the additive tank 58 to the first measuring tube 53, and places it in the closed state when the first initial fill cycle is completed.

Similarly, with respect to the embodiment illustrated in FIG. 2, the control unit 30 is configured to control the second fill valve 66 to carry out the second initial fill cycle. In the second initial fill cycle, the fluid is transferred from the additive tank 58 to the second measuring tube 63 by the second fill valve 66 to fill the second measuring tube 63 with the fluid for the first time before the control unit 30 carries out the plurality of fluid dispensing cycles. More specifically, during the second initial fill cycle, the fluid is transferred from the additive tank 58 to fill the second measuring tube 63 with the fluid to be dispensed during the second initial fluid dispensing cycle described above. The control unit 30 places the second fill valve 66 in the open state to transfer the fluid from the additive tank 58 to the second measuring tube 63, and places it in the closed state when the second initial fill cycle is completed.

In this embodiment, the control unit 30 preferably is configured to control the first fill valve 56 and the second fill valve 66 to carry out the first initial fill cycle and the second initial fill cycle substantially simultaneously.

With respect to the embodiment illustrated in FIG. 5, the control unit 30 is configured to control the three-way fill valve 76 by alternately placing it in the first state and the second state to carry out the first initial fluid fill cycle and the second initial fluid fill cycle. In this embodiment, to carry out the first initial fluid fill cycle, the control unit 30 places the three-way fill valve 76 in the first state. In this state, the fluid is transferred from the additive tank 58 through the three-way fill valve 76 to the first measuring tube 53. To carry out the second initial fluid fill state, the control unit 30 places the three-way fill valve 76 in the second state. In this state, the fluid is transferred from the additive tank 58 through the three-way fill valve 76 to the second measuring tube 63. More specifically, during the first initial fluid fill cycle, the fluid from the additive tank 58 flows through the three-way fill valve 76 from the third port to the first port to the first measuring tube 53. Similarly, during the second initial fluid fill cycle, the fluid from the additive tank 58 flows through the three-way fill valve 76 from the third port to the second port to the second measuring tube 63.

Following the first initial fill cycle and the second initial fill cycle, the control unit 30 is configured to carry out a plurality of fluid refill cycles. In the embodiment illustrated in FIG. 2, the control unit 30 is configured to control the first fill valve 56 and the second fill valve 66 to carry out the plurality of fluid refill cycles wherein the fluid alternately is transferred from the additive tank 58 to the first measuring tube 53 by the first fill valve 56 and to the second measuring tube 63 by the second fill valve 66 to alternately refill the first measuring tube and the second measuring tube with the fluid from the additive tank 58.

Following the first initial fill cycle, each time the control unit 30 controls the first fill valve 56 to transfer the fluid from the additive tank 58 to the first measuring tube 53 comprises a subsequent fluid refill cycle of the first plurality of subsequent fluid refill cycles. The fluid transferred to the first measuring tube 53 during each such subsequent fluid refill cycle refills the first measuring tube 53 and replaces the fluid that was previously dispensed from the first measuring tube 53 during a subsequent dispensing cycle of the first plurality of subsequent dispensing cycles described above. Similarly, the fluid with which the first measuring tube 53 is refilled will be dispensed by the first measuring tube 53 during another subsequent dispensing cycle of the first plurality of subsequent dispensing cycles described above.

Similarly, following the second initial fill cycle, each time the control unit 30 controls the second fill valve 66 to transfer the fluid from the additive tank 58 to the second measuring tube 63 comprises a subsequent fluid refill cycle of the second plurality of subsequent fluid refill cycles. The fluid transferred to the second measuring tube 63 during each such subsequent fluid refill cycle refills the second measuring tube 63 and replaces the fluid that was previously dispensed from the second measuring tube 63 during a subsequent dispensing cycle of the second plurality of subsequent dispensing cycles described above. Similarly, the fluid with which the second measuring tube 63 is refilled will be dispensed by the second measuring tube 63 during another subsequent dispensing cycle of the second plurality of subsequent dispensing cycles described above.

The control unit 30 is configured to control the first fill valve 56 and the second fill valve 66 to alternately carry out each subsequent fluid refill cycle of the first plurality of subsequent fluid refill cycles and each subsequent fluid refill cycle of the second plurality of subsequent fluid refill cycles. The control unit 30 is further configured to control the first fill valve 56, the second fill valve 66, the first injection valve 57, and the second injection valve 67 to carry out the plurality of fluid refill cycles substantially simultaneously with the plurality of fluid dispensing cycles, thus ensuring that the fluid is dispensed substantially continuously and without interruption in flow to the injection point 18.

More particularly, the control unit 30 is configured to carry out the first plurality of subsequent fluid refill cycles and the second plurality of subsequent fluid refill cycles alternately and substantially simultaneously with the plurality of fluid dispensing cycles. Still more particularly, the control unit 30 is configured to carry out the first plurality of subsequent fluid refill cycles, the second plurality of subsequent fluid refill cycles, the first plurality of subsequent dispensing cycles, and the second plurality of subsequent dispensing cycles simultaneously and alternately so that as a subsequent dispensing cycle of the second plurality of subsequent dispensing cycles is being carried out, a subsequent fluid refill cycle of the first plurality of subsequent fluid refill cycles is simultaneously being carried out, and as a subsequent dispensing cycle of the first plurality of subsequent dispensing cycles is being carried out, a subsequent fluid refill cycle of the second plurality of subsequent fluid refill cycles is simultaneously being carried out.

In other words, as the fluid is being dispensed from the second measuring tube 63 in a subsequent dispensing cycle, the first measuring tube 53 is simultaneously being refilled in a subsequent refill cycle, and as the fluid is being dispensed from the first measuring tube 53 in a subsequent dispensing cycle, the second measuring tube 63 is simultaneously being refilled in a subsequent refill cycle. This ensures that the first measuring tube 53 and the second measuring tube 63 are always filled with the fluid to be dispensed during a subsequent dispensing cycle which in turn ensures the fluid is dispensed from the first measuring tube 53 and the second measuring tube 63 substantially continuously and without interruption in flow to the injection point 18.

With respect to the embodiment illustrated in FIG. 5, the control unit 30 is configured to control the state of the three-way fill valve 76 to carry out the plurality of fluid refill cycles, and more particularly the first plurality of subsequent refill cycles and the second plurality of subsequent refill cycles, in substantially the same way as described above with respect to the embodiment illustrated in FIG. 2. Thus, the control unit 30 is configured to control the three-way fill valve 76 to carry out the plurality of fluid refill cycles so that the fluid alternately is transferred from the additive tank 58 to the first measuring tube 53 by placing the three-way fill valve 76 in the first state, and is transferred to the second measuring tube 63 by placing the three-way fill valve 76 in the second state. This alternately refills the first measuring tube 53 and the second measuring tube 63 with the fluid in the same manner described above.

Following the first initial fill cycle, each time the control unit 30 places the three-way fill valve 76 in the first state to transfer the fluid from the additive tank 58 to the first measuring tube 53 comprises a subsequent fluid refill cycle of the first plurality of subsequent fluid refill cycles. Similarly, following the second initial fill cycle, each time the control unit 30 places the three-way fill valve 76 in the second state to transfer the fluid from the additive tank 58 to the second measuring tube 63 comprises a subsequent fluid refill cycle of the second plurality of subsequent fluid refill cycles.

The control unit 30 is configured to alternately place the three-way fill valve 76 in the first state and in the second state to alternately carry out each subsequent fluid refill cycle of the first plurality of subsequent fluid refill cycles and each subsequent fluid refill cycle of the second plurality of subsequent fluid refill cycles. The control unit 30 is further configured to control the three-way fill valve 76 and the three-way injection valve 77 to carry out the plurality of subsequent fluid refill cycles substantially simultaneously with the plurality of fluid dispensing cycles, thus ensuring that the fluid is dispensed and directed to the injection point 18 substantially continuously and without interruption in flow.

It is noted and should be appreciated that the references herein to filling and refilling the first measuring tube 53 and the second measuring tube 63 are not meant or intended to be interpreted as requiring the first and second measuring tubes 53, 63 to be completely filled or refilled with the fluid. Rather, the first and second measuring tubes 53, 63 may be filled and refilled to any level suitable to carry out the objectives identified herein. Further, the first and second measuring tubes 53, 63 need not be filled or refilled to the same level, and need not be filled or refilled to the same level during each initial fluid fill cycle or subsequent fluid refill cycle.

The control unit 30 is configured to determine a first volume of the fluid dispensed from the first measuring tube 53 during each fluid dispensing cycle in which the fluid was dispensed from the first measuring tube 53. The control unit 30 also is configured to determine a second volume of the fluid dispensed from the second measuring tube 63 during each fluid dispensing cycle in which the fluid was dispensed from the second measuring tube 63. The control unit 30 is further configured to calculate from the first volume and the second volume determined during each fluid dispensing cycle a total volume of the fluid dispensed during a plurality of fluid dispensing cycles.

More particularly, the control unit 30 is configured to determine the first volume of the fluid dispensed from the first measuring tube 53 during each fluid dispensing cycle by determining the initial volume of the fluid in the first measuring tube 53 following the first initial fill cycle or a subsequent fluid refill cycle of the first plurality of fluid refill cycles and before the fluid is dispensed from the first measuring tube 53. The control unit 30 then determines the remaining volume of the fluid in the first measuring tube 53 following completion of the fluid dispensing cycle and before carrying out a subsequent fluid refill cycle of the first plurality of fluid refill cycles. The control unit 30 then subtracts the remaining volume of the fluid from the initial volume of the fluid to determine the first volume of the fluid dispensed during the fluid dispensing cycle.

The control unit 30 is configured similarly to determine the second volume of the fluid dispensed from the second measuring tube 63 during each fluid dispensing cycle by determining the initial volume of the fluid in the second measuring tube 63 following the second initial fill cycle or a subsequent fluid refill cycle of the second plurality of fluid refill cycles before the fluid is dispensed from the second measuring tube 63, determining the remaining volume of the fluid in the second measuring tube 63 following completion of the fluid dispensing cycle and before carrying out a subsequent fluid refill cycle of the second plurality of fluid refill cycles, and subtracting the remaining volume from the initial volume to determine the second volume of the fluid dispensed during the fluid dispensing cycle.

The control unit 30 is configured to communicate with the first pressure sensor 54 and to obtain an indication of the volume of the fluid in the first measuring tube 53 from the first pressure sensor 54. The control unit 30 thus obtains indications from the first pressure sensor 54 of the initial volume and the remaining volume of the fluid in the first measuring tube 53 and determines the initial volume and the remaining volume based on these indications as described herein.

Similarly, the control unit 30 is configured to communicate with the second pressure sensor 64 and to obtain an indication of the volume of the fluid in the second measuring tube 63 from the second pressure sensor 64. The control unit 30 thus obtains indications from the second pressure sensor 64 of the initial volume and the remaining volume of the fluid in the second measuring tube 63 and determines the initial volume and the remaining volume based on these indications as described herein.

The control unit 30 is configured to determine the volume of the fluid in the first measuring tube 53 and in the second measuring tube 63 at any given time using formulas based on known parameters of the first measuring tube 53 and the second measuring tube 63, e.g., diameter, as well as known parameters of the fluid, e.g., density and temperature. The values of the parameters may be hard-coded or may be entered by an operator at run-time or otherwise, e.g., fluid density, and/or may be obtained from one or more sensors, e.g., temperature from temperature sensor 42.

The control unit 30 also is configured to determine the initial volume of the fluid in the additive tank 58 and the volume of the fluid in the additive tank 58 at the end of the first initial fluid fill cycle and at the end of each subsequent fluid refill cycle of the first plurality of subsequent fluid refill cycles in which the fluid was transferred from the additive tank 58 to the first measuring tube 53. The control unit 30 also is configured to determine the volume of the fluid in the additive tank 58 after the second initial fluid fill cycle and after each subsequent fluid refill cycle of the second plurality of subsequent fluid refill cycles in which the fluid was transferred from the additive tank 58 to the second measuring tube 63.

The control unit 30 may determine the initial volume of the fluid in the additive tank 58 in a number of suitable ways. For example, the control unit 30 may receive the initial volume of the fluid in the additive tank 58 as input data entered by an operator. Alternatively, the control unit 30 may calculate the initial volume based on the level of the fluid in the additive tank 58 as measured and entered by an operator, or as indicated by a sensor, and based on the size and shape of the additive tank 58, which may be hard-coded in the system or entered by an operator.

Similarly, the control unit 30 is configured to determine the volume of the fluid remaining in the additive tank 58 following the first initial fluid fill cycle, the second initial fluid fill cycle, each subsequent fluid refill cycle of the first plurality of subsequent fluid refill cycles, and each subsequent fluid refill cycle of the second plurality of subsequent fluid refill cycles by measuring the level of the fluid in the first measuring tube 53 or the second measuring tube 63 after each time it is filled or refilled, and calculating the volume of the fluid remaining in the additive tank 58 at each of those points in time based on the size and shape of the additive tank 58. This assumes that during the first initial fluid fill cycle, the second initial fluid fill cycle, and each subsequent fluid refill cycle of the first plurality of subsequent fluid refill cycles and the second plurality of subsequent fluid refill cycles, the first measuring tube 53 and the second measuring tube 63 are filled and refilled to the same level as the fluid in the additive tank 58. However, persons skilled in the art will appreciate that other formulas are available and could readily be used to calculate the volume of the fluid remaining in the additive tank 58 if the first measuring tube 53 and the second measuring tube 63 are filled and refilled to a different level or levels.

The control unit 30 also is configured to determine a first volume of the fluid dispensed from the first measuring tube 53 as the fluid is being dispensed and to determine a second volume of the fluid dispensed from the second measuring tube 63 as the fluid is being dispensed. The control unit 30 also is configured to determine whether the first volume of the fluid dispensed from the first measuring tube 53 has reached a first value and whether the second volume of the fluid dispensed from the second measuring tube 63 has reached a second value.

The control unit 30 is configured to determine the first volume of the fluid dispensed from the first measuring tube 53 as it is being dispensed based on the indication of the volume of the fluid in the first measuring tube 53 as the fluid is being dispensed provided by the first sensor 54. The control unit 30 is configured to determine the second volume of the fluid dispensed from the second measuring tube 63 as it is being dispensed based on the indication of the volume of the fluid in the second measuring tube 63 as the fluid is being dispensed provided by the second sensor 64. The control unit 30 can determine the volume of the fluid in the first measuring tube 53 and the second measuring tube 63 as fluid is being dispensed from the indications of volume provided by the first sensor 54 and the second sensor 64 in the manner described herein.

More particularly, the control unit 30 is configured to determine the first volume of the fluid dispensed from the first measuring tube 53 as the fluid is being dispensed by determining the initial volume of the fluid in the first measuring tube 53 before the fluid is dispensed from the first measuring tube 53, determining the remaining volume of the fluid in the first measuring tube 53 periodically as the fluid is dispensed from the first measuring tube 53, and subtracting the remaining volume from the initial volume. Similarly, the control unit 30 is configured to determine the second volume of the fluid dispensed from the second measuring tube 63 as the fluid is being dispensed by determining the initial volume of the fluid in the second measuring tube 63 before the fluid is dispensed from the second measuring tube 63, determining the remaining volume of the fluid in the second measuring tube 63 periodically as the fluid is dispensed from the second measuring tube 63, and subtracting the remaining volume from the initial volume.

Also more particularly, the control unit 30 is configured to determine whether the first volume of the fluid dispensed from the first measuring tube 53 has reached a first value by comparing a first result obtained by periodically subtracting the remaining volume from the initial volume as described above and periodically comparing it to the first value. Similarly, the control unit 30 is configured to determine whether the second volume of the fluid dispensed from the second measuring tube 63 has reached a second value by comparing a second result obtained by periodically subtracting the remaining volume from the initial volume as described above and periodically comparing it to the second value. The control unit 30 may receive the first value and the second value as input from a user or operator of the system.

The control unit 30 is configured to periodically communicate with the first sensor 54 and to periodically obtain indications of the volume of the fluid in the first measuring tube 53 as the fluid is being dispensed from the first measuring tube 53. Similarly, the control unit 30 is configured to periodically communicate with the second sensor 64 and to periodically obtain indications of the volume of the fluid in the second measuring tube 63 as the fluid is being dispensed from the second measuring tube 63. The control unit 30 periodically determines the volume of the fluid in the first measuring tube 53 and in the second measuring tube 63 as the fluid is being dispensed from the indications provided by the first sensor 54 and the second sensor 64 in the same manner described herein.

The control unit 30 is further configured alternately to control the first injection valve 57 to direct the fluid dispensed from the first measuring tube 53 to the fluid injection point 18 and to control the second injection valve 67 to direct the fluid dispensed from the second measuring tube 63 to the fluid injection point 18 based on the control unit 30 determining the first volume of the fluid dispensed from the first measuring tube 53 and the second volume of the fluid dispensed from the second measuring tube 63. More particularly, the control unit 30 is configured to control the first injection valve 57 and the second injection valve 67 as described based on the control unit 30 determining the first volume of the fluid dispensed from the first measuring tube 53 has reached the first value and the second volume of the fluid dispensed from the second measuring tube 63 has reached the second value, those determinations being made as described above.

Still more particularly, based on determining the first volume of the fluid dispensed from the first measuring tube 53 has reached the first value, the control unit 30 is configured to substantially simultaneously control the first injection valve 57 to prevent the first injection valve 57 from directing the fluid dispensed from the first measuring tube 53 to the injection point 18, and control the second injection valve 67 to direct the fluid dispensed from the second measuring tube 63 to the injection point 18. Further, based on determining the second volume of the fluid dispensed from the second measuring tube 63 has reached the second value, the control unit 30 is configured to substantially simultaneously control the first injection valve 57 to direct the fluid dispensed from the first measuring tube 53 to the injection point 18, and control the second injection valve 67 to prevent the second injection valve 67 from directing the fluid dispensed from the second measuring tube 63 to the injection point 18.

Alternatively, the control unit 30 is further configured to control the three-way injection valve 77 to alternately place it in the first state to direct the fluid dispensed from the first measuring tube 53 to the injection point 18 and in the second state to direct the fluid dispensed from the second measuring tube 63 to the injection point 18 based on the control unit 30 determining the first volume of the fluid dispensed from the first measuring tube 53 and the second volume of the fluid dispensed from the second measuring tube 63. More particularly, the control unit 30 is configured to control the three-way injection valve 77 to operate as described based on determining the first volume of the fluid dispensed from the first measuring tube 53 has reached the first value and the second volume of the fluid dispensed from the second measuring tube 63 has reached the second value, those determinations being made as described above.

The control unit 30 also is configured alternately to control the first fill valve 56 to transfer the fluid from the additive tank 58 to the first measuring tube 53 to refill the first measuring tube 53 with the fluid, and to control the second fill valve 66 to transfer the fluid from the additive tank 58 to the second measuring tube 63 to refill the second measuring tube 63 with the fluid based on the control unit 30 determining the first volume of the fluid dispensed from the first measuring tube 53 and the second volume of the fluid dispensed from the second measuring tube 63.

More particularly, based on determining the first volume of the fluid dispensed from the first measuring tube 53 has reached the first value, the control unit 30 is configured to control the first fill valve 56 to transfer the fluid from the additive tank 58 to the first measuring tube 53 to refill the first measuring tube 53, and based on determining the second volume of the fluid dispensed from the second measuring tube 63 has reached the second value, the control unit 30 is configured to control the second fill valve 66 to transfer the fluid from the additive tank 58 to the second measuring tube 63 to refill the second measuring tube 63. Both determinations are made as described above.

Alternatively, the control unit 30 is further configured to control the three-way fill valve 76 to alternately place it in the first state to transfer the fluid from the additive tank 58 to the first measuring tube 53 and in the second state to transfer the fluid from the additive tank 58 to the second measuring tube 63 based on the control unit 30 determining the first volume of the fluid dispensed from the first measuring tube 53 and the second volume of the fluid dispensed from the second measuring tube 63. More particularly, the control unit 30 is configured to control the three-way injection valve 77 to operate as described based on determining the first volume of the fluid dispensed from the first measuring tube 53 has reached the first value and the second volume of the fluid dispensed from the second measuring tube 63 has reached the second value, those determinations being made as described above.

Accordingly, when the control unit 30 determines a first volume of fluid has been dispensed from the first measuring tube 53, it controls the first injection valve 57 and places it in the closed state, and controls the second injection valve 67 and places it in the open state. Alternatively, the control unit 30 switches the three-way injection valve 77 from the first state to the second state. The first injection valve 57 is thus prevented from directing any additional fluid dispensed from the first measuring tube 53 to the injection point 18 and the second injection valve 67 instead directs the fluid dispensed from the second measuring tube 63 to the injection point 18. Alternatively, the three-way fill valve 77 prevents additional fluid dispensed from the first measuring tube 53 from flowing through the valve and being directed to the injection point 18 and instead allows fluid dispensed from the second measuring tube 63 to flow through the valve to the injection point 18.

While this is happening, the control unit 30 also controls the first fill valve 56 to place it in the open state to transfer the fluid from the additive tank 58 to the first measuring tube 53 to refill the first measuring tube 53. Alternatively, the control unit 30 controls the three-way fill valve 76 and places it in the first state to transfer the fluid from the additive tank 58 to the first measuring tube 53 to refill the first measuring tube 53.

Similarly, when the control unit 30 determines a second volume of fluid has been dispensed from the second measuring tube 63, it controls the second injection valve 67 and places it in the closed state, and controls the first injection valve 57 and places it in the open state. Alternatively, the control unit 30 switches the three-way injection valve 77 from the second state to the first state. The second injection valve 67 is thus prevented from directing any additional fluid dispensed from the second measuring tube 63 to the injection point 18 and the first injection valve 57 instead directs the fluid dispensed from the first measuring tube 53 to the injection point 18. Alternatively, the three-way fill valve 77 prevents additional fluid dispensed from the second measuring tube 63 from flowing through the valve to the injection point 18 and instead allows the fluid dispensed from the first measuring tube 53 to flow through the valve to the injection point 18. The control unit 30 is configured to alternately control the first injection valve 57 and the second injection valve 67, or alternatively the three-way injection valve 77, in the manner described above to alternately direct the fluid dispensed from the first measuring tube 53 and from the second measuring tube 63 to the injection point 18 indefinitely.

While this is happening, the control unit 30 also controls the second fill valve 66 to transfer the fluid from the additive tank 58 to the second measuring tube 63 to refill the second measuring tube 63. Alternatively, the control unit 30 controls the three-way fill valve 76 to place it in the second state to transfer the fluid from the additive tank 58 to the second measuring tube 63 to refill the second measuring tube 63.

The control unit 30 is configured to control the first injection valve 57 and the second injection valve 67 simultaneously or substantially simultaneously. In addition, and as described above, the control unit 30 is configured to alternately refill the first measuring tube 53 while the fluid is being dispensed from the second measuring tube 63, and to refill the second measuring tube 63 while the fluid is being dispensed from the first measuring tube 53. Accordingly, the fluid is dispensed substantially continuously and without substantial interruption in the flow, and the switching back and forth between the first measuring tube 53 dispensing the fluid and the second measuring tube 63 dispensing the fluid is effectively seamless.

In some applications, it may be desirable to use a flow meter 40 to provide the control unit 30 with flowrate information, such as the flowrate of a main fluid or gas in a pipeline to which the additive fluid is to be added. It is often necessary to treat the fluid or gas flowing in a pipeline with a continuous flow of additive fluid but to vary the rate or amount of the additive fluid being injected to proportionally match the fluid or gas flowrate or volume in the pipeline in order to properly treat the medium. For example, it may be desirable to control the injection rate of an additive fluid based on the flow rate of the fluid or gas in a pipeline in a salt water disposal application or in a gas pipeline application where the additive fluid is to be dosed based on the volume of gas flowing in the pipeline. In such applications, the control unit 30 can be configured to use the flowrate information provided by the flow meter 40 to further control the filling, dispensing, and directing of varying doses of the additive fluid from the additive tank 58 to the injection point 18 in real time in order to treat the main medium accurately.

If utilized, the flow meter 40 is in communication with the control unit 30 and is preferably located in the fluid or gas pipeline to be treated near the injection point 18 which is in turn near the output of the fluid pump 52. The control unit 30 is configured to communicate with the flow meter 40 and to continuously or periodically obtain from the flow meter 40 an indication of the flowrate of the fluid or gas flowing in the pipeline. From this information, the control unit 30 can calculate the volume of the fluid or gas flowing in the pipeline through the flow meter 40 over a given period of time, and from that information it can calculate the volume of additive fluid that should be dispensed by the first measuring tube 53 and the second measuring tube 63 and directed to the injection point 18 via the first injection valve 57 and the second injection valve 67 over that given period of time.

The control unit 30 can be configured accordingly to control the first and second fill valves 56, 66 (or the three-way fill valve 76) to fill the first and second measuring tubes 53, 63 with the desired volume of additive fluid, and to control the first and second injection valves 57, 67 (or the three-way injection valve 77) to direct the desired volume of the additive fluid to the injection point 18. For example, based on the periodic indications of flowrate obtained from the flow meter 40, the control unit 30 may change the desired level or volume to which the first and second measuring tubes 53, 63 are filled and hence the volume of additive fluid they dispense in real time as the flow rate in the pipeline varies. However, while the control unit 30 may vary the volume of the fluid dispensed and directed to the injection point 18 over time, it remains preferred that the fluid be dispensed and directed to the injection point 18 substantially continuously and without substantial interruption in flow.

J. Operation of Preferred Embodiment.

Figure 3:
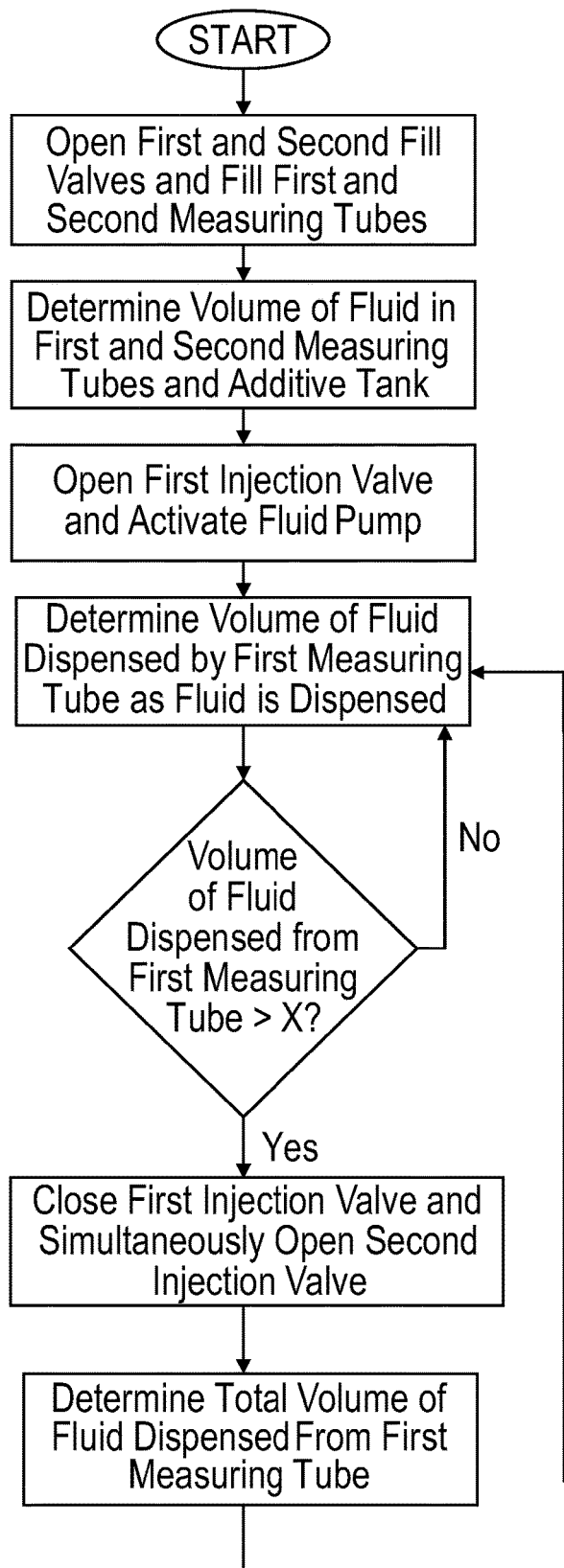
FIG. 3 is a flowchart illustrating the functionality of a continuous fluid metering system in accordance with an example embodiment.
Figure 3:
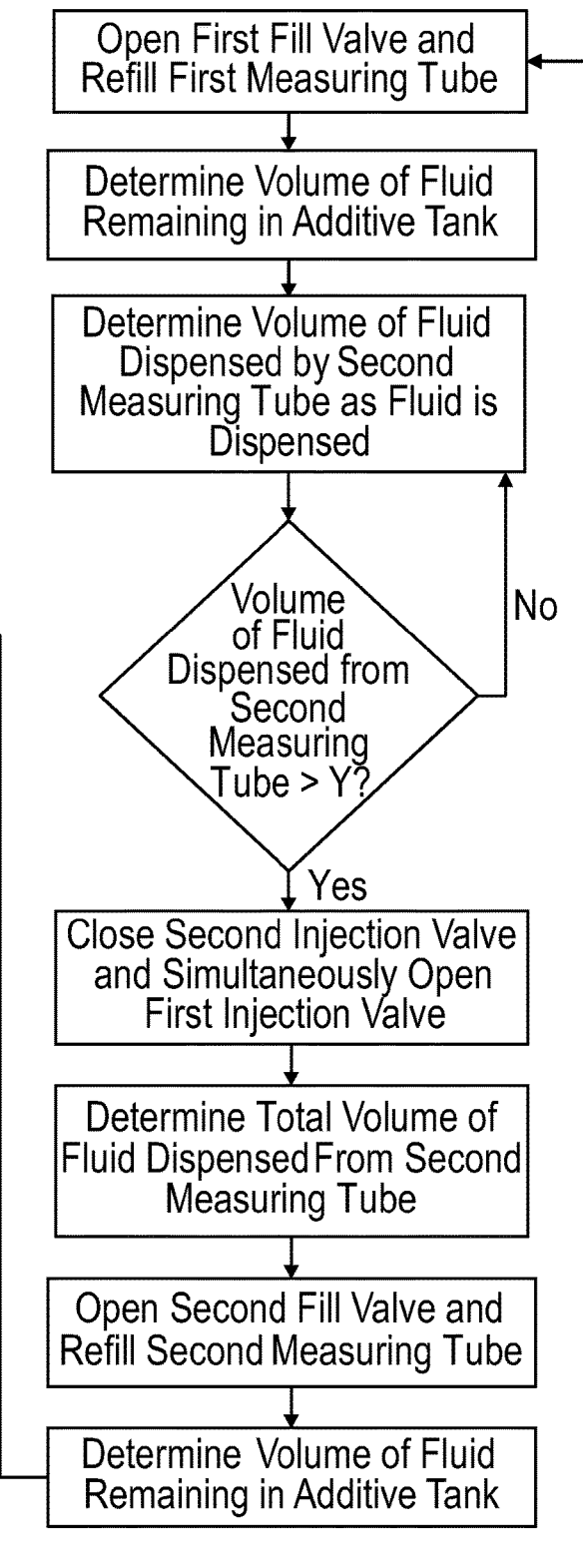
Figure 6:
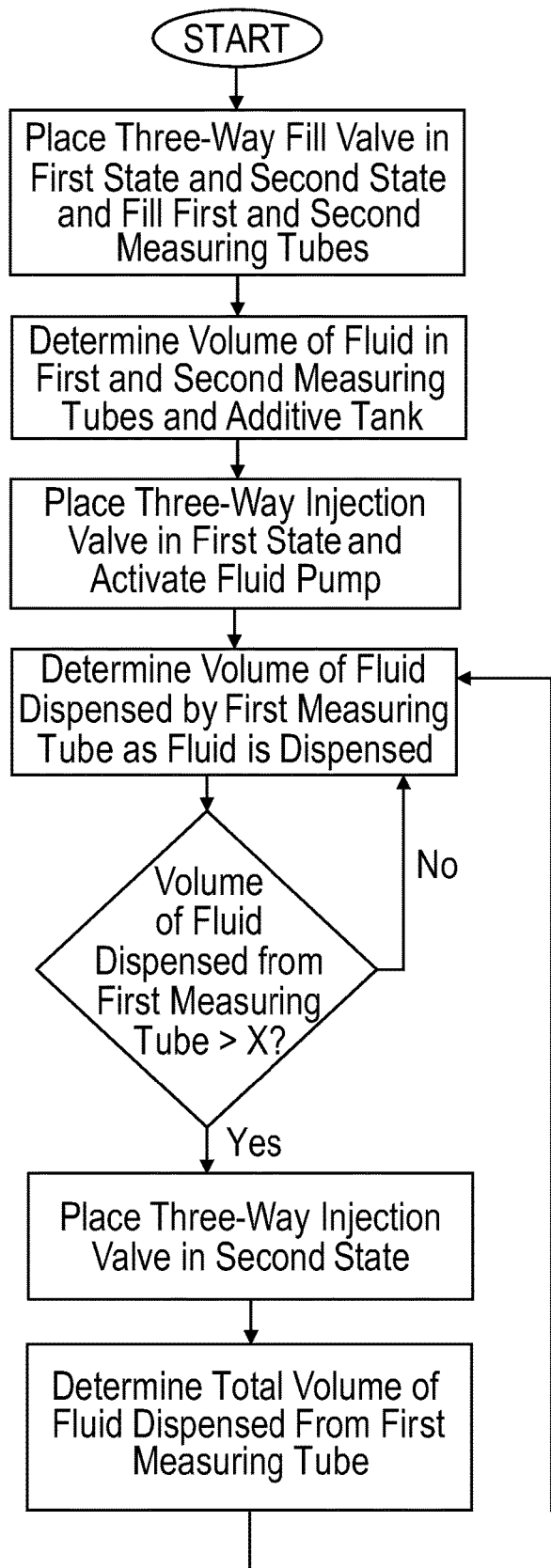
FIG. 6 is a flowchart illustrating the functionality of a continuous fluid metering system in accordance with an alternative example embodiment.
Figure 6:
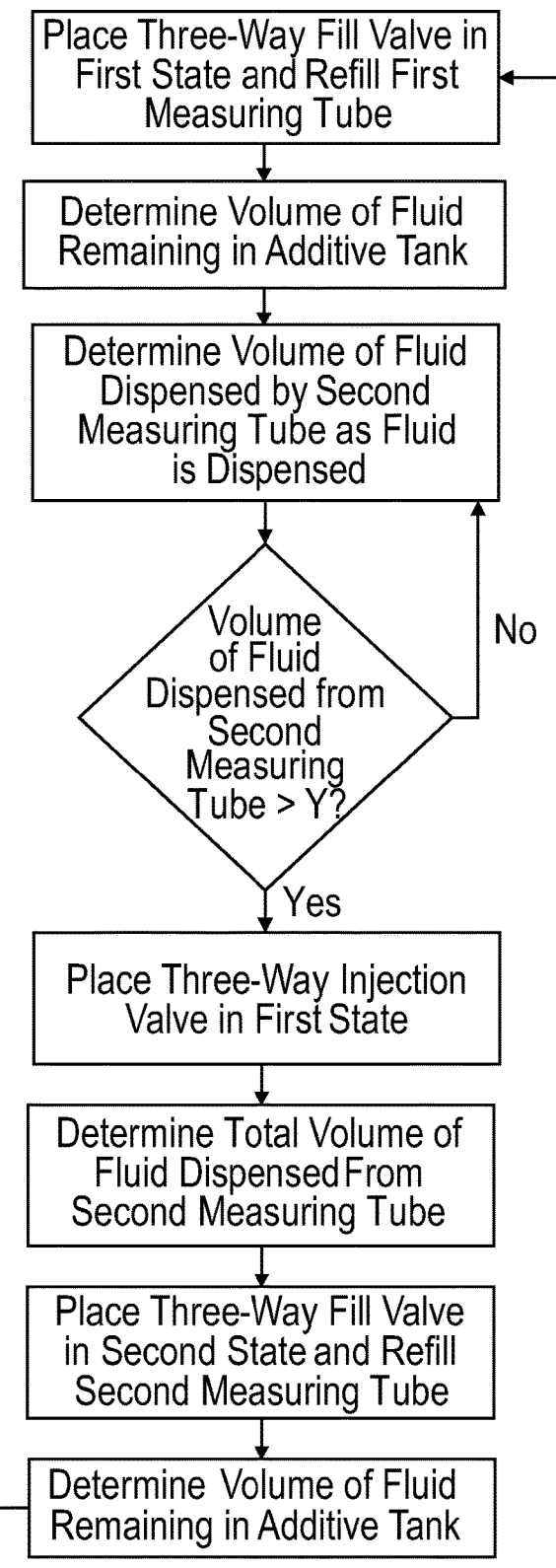

FIG. 3 illustrates an example of use and operation of the example embodiment of the continuous fluid metering system 10 illustrated in FIGS. 1-2. FIG. 6 illustrates an example of use and operation of the alternative example embodiment of the continuous fluid metering system 10 illustrated in FIGS. 4-5.

In both embodiments, an operator of the continuous fluid metering system 10 can initially enter various data and parameters necessary to carry out the continuous dispensing and injection process using a keypad and screen or other data entry components of the control unit 30. Alternatively, the necessary data and parameters can be entered remotely from mobile device 14 or from central communication unit 20 via telecommunications network 12.

The data and parameters may include, for example, the internal diameters and other structural parameters of the first and second measuring tubes 53, 63 and the additive tank 58, the density and/or other parameters of the fluid to be injected, the initial volume of the fluid in the additive tank 58, the number of desired dispensing and injection cycles to be carried out and/or the total volume of fluid to be dispensed and injected. The data and parameters may also include the volume of the fluid to be transferred from the additive tank 58 to the first and second measuring tubes 53, 63 during the first and second initial fluid fill cycles and during subsequent fluid refill cycles.

The data and parameters may also include the first value of the volume of fluid to be dispensed from the first measuring tube 53 before dispensing is switched to the second measuring tube 63 and the second value of the volume of fluid to be dispensed from the second measuring tube 63 before dispensing is switched back to the first measuring tube 53. Preferably, the first and second values correspond to volumes of fluid that are somewhat less than the entire volumes of fluid with which the first measuring tube 53 and the second measuring tube 63 respectively were filled or refilled. Rather, the first and second values preferably correspond to volumes of fluid that will leave a small volume of fluid remaining in the bottom of the first measuring tube 53 and the second measuring tube 63 respectively after the volumes of fluid corresponding to the first and second values respectively are dispensed. This helps to ensure the continuous flow of the fluid dispensed from the first measuring tube 53 and from the second measuring tub 63 to the pump 52 and to the injection point 18. Alternatively, however, the first and second values can correspond to the entire volumes of fluid in the first measuring tube 53 and the second measuring tube 63 respectively so long as this does not result in a substantial interruption in the flow of the fluid dispensed from the first measuring tube 53 and the second measuring tube 63 to the pump 52 and to the injection point 18.

Once all necessary data and parameters are entered, the operator commands the control unit 30 to start the continuous dispensing and injection process. The operator may enter the start command locally using the keypad or other means, or remotely using the mobile device 14, central communication unit 20, or other means.

In connection with the example embodiment illustrated in FIGS. 1-2 and as illustrated in FIG. 3, in response to the start command, the control unit 30 opens the first fill valve 56 and the second fill valve 66 to carry out the first initial fill cycle and the second initial fill cycle in order to fill the first measuring tube 53 and the second measuring tube 63 respectively with fluid from the additive tank 58. As described herein, the control unit 30 closes the first injection valve 57 and the second injection valve 67 while the first initial fill cycle and the second initial fill cycle are being carried out to isolate the first measuring tube 53 and the second measuring tube 63 from the pump 52 and injection point 18.

When the first initial fill cycle and the second initial fill cycle are completed, the control unit 30 closes the first fill valve 56 and the second fill valve 66. The control unit 30 then determines a first initial volume of the fluid in the first measuring tube 53 and a second initial volume of the fluid in the second measuring tube 63 in the manner described herein.

The control unit 30 then initiates the first initial dispensing cycle by opening the first injection valve 57 and activating the pump 52. During the first initial dispensing cycle, the fluid dispensed by the first measuring tube 53 is drawn through the first injection valve 57 by the pump 52 and is directed by the pump 52 to the injection point, e.g., the oil well 18, where it is injected.

While the first initial dispensing cycle is being carried out, the control unit 30 continuously or periodically communicates with the first sensor 54, obtains indications of the volume of the fluid in the first measuring tube 53 from the first sensor 54, and continuously or periodically determines the volume of fluid dispensed from the first measuring tube 53 as the fluid is being dispensed. The control unit 30 also continuously or periodically determines if the volume of fluid dispensed from the first measuring tube 53 has reached the first value "X," for example, and if not, continues to communicate with the first sensor 54. Once the control unit 30 determines the volume of dispensed fluid has reached the first value "X," the control unit 30 closes the first injection valve 57 and simultaneously opens the second injection valve 67. This completes the first initial dispensing cycle and simultaneously initiates the second initial dispensing cycle.

It is noted and should be apparent from the description herein that as used in the present context, "simultaneously" means and includes not only "precisely simultaneously" but also "substantially simultaneously." Thus, while the states of the first injection valve 57 and the second injection valve 67 may be changed precisely simultaneously, it does not deviate from the concepts of the present invention for the states of the first injection valve 57 and the second injection valve 67 to be changed substantially simultaneously, and even sequentially, as long as the flow of the fluid dispensed from the first measuring tube 53 and the second measuring tube 63 and pumped by the pump 52 to the injection point is substantially continuous while the states of the first injection valve 57 and the second injection valve 67 are being changed.

During the transition between the first initial dispensing cycle and the second initial dispensing cycle, the flow of the fluid being dispensed is continuous, first from the first measuring tube 53 and then from the second measuring tube 63. In addition, the dispensed fluid is continuously provided by the pump 52 to the injection point for injection.

It is noted and should be apparent from the description herein that as used in the present context, "continuous" and "continuously" are intended to mean and include "substantially continuous" and "without substantial interruption." That is, the flow of fluid dispensed from the first measuring tube 53 and from the second measuring tube 63 and directed by the pump 52 to the injection point could slow or even be briefly interrupted from time to time as dispensing of the fluid alternates between the first measuring tube 53 and the second measuring tube 63. This can occur without deviating from the concepts of the present invention, provided that the flow of the fluid dispensed alternately by the first measuring tube 53 and the second measuring tube 63 and directed by the pump 52 to the injection point 18 continues for substantially the entire period of time the continuous dispensing and injection process is being carried out.

Upon completion of the first initial dispensing cycle and before initiating a fluid refill cycle with respect to the first measuring tube 53, the control unit 30 determines the volume of the fluid remaining in the first measuring tube 53, and calculates the volume of fluid dispensed from the first measuring tube 53 during the first initial dispensing cycle. The control unit 30 then opens the first fill valve 56 (with the first injection valve 57 in the closed state) and carries out a subsequent refill cycle of the first plurality of subsequent refill cycles in order to refill the first measuring tube 53 with fluid from the additive tank 58. At the end of the refill cycle, the control unit 30 determines the volume of the fluid remaining in the additive tank 58.

During the second initial dispensing cycle, the fluid dispensed by the first measuring tube 53 is drawn through the first injection valve 57 by the pump 52 and continues to be directed by the pump 52 to the injection point, e.g., the oil well 18, where it is injected.

While the second initial dispensing cycle is being carried out, the control unit 30 continuously or periodically communicates with the second sensor 64, obtains indications of the volume of the fluid in the second measuring tube 63 from the second sensor 54, and continuously or periodically determines the volume of fluid dispensed from the second measuring tube 63 as the fluid is being dispensed. The control unit 30 also continuously or periodically determines if the volume of dispensed fluid has reached the second value "Y," for example, and if not, continues to communicate with the second sensor 64. Once the control unit 30 determines the volume of dispensed fluid has reached the second value "Y," the control unit 30 closes the second injection valve 67 and simultaneously opens the first injection valve 57. This completes the second initial dispensing cycle and simultaneously initiates a subsequent dispensing cycle of the first plurality of subsequent dispensing cycles using fluid dispensed from the first measuring tube 53.

Again, during the transition between the second initial dispensing cycle and the subsequent dispensing cycle of the first plurality of subsequent dispensing cycles, the flow of the fluid dispensed first from the second measuring tube 63 and then from the first measuring tube 53 is continuous. In addition, the fluid dispensed is continuously provided by the pump 52 to the injection point for injection without substantially interruption in the flow.

Upon completion of the second initial dispensing cycle and before initiating a fluid refill cycle with respect to the second measuring tube 63, the control unit 30 determines the volume of the fluid remaining in the second measuring tube 63, and calculates the volume of fluid dispensed from the second measuring tube 63 during the second initial dispensing cycle. The control unit 30 then opens the second fill valve 66 (with the second injection valve 67 in the closed state) and carries out a subsequent refill cycle of the second plurality of subsequent refill cycles in order to refill the second measuring tube 63 with fluid from the additive tank 58. After the refill cycle is complete, the control unit 30 determines the volume of the fluid remaining in the additive tank 58.

During the subsequent dispensing cycle of the first plurality of subsequent dispensing cycles, the fluid dispensed by the first measuring tube 53 is drawn through the first injection valve 57 by the pump 52 and continues to be directed by the pump 52 to the injection point, e.g., the oil well 18, where it is injected.

While the subsequent dispensing cycle of the first plurality of subsequent dispensing cycles is being carried out, the control unit 30 continuously or periodically determines the volume of the fluid dispensed from the first measuring tube 53 as the fluid is dispensed. When control unit 30 determines the dispensed volume has reached the value "X," or another predetermined value set prior to the continuous dispensing and injection process being initiated, the control unit 30 again closes the first injection valve 57 and simultaneously opens the second injection valve 67. This completes the subsequent dispensing cycle of the first plurality of subsequent dispensing cycles using fluid dispensed from the first measuring tube 53 and simultaneously initiates a subsequent dispensing cycle of the second plurality of subsequent dispensing cycles using fluid from the second measuring tube 63.

The foregoing process continues with the fluid being continuously dispensed alternately from the first measuring tube 53 and the second measuring tube 63, the first measuring tube 53 and second measuring tube 63 being alternately and repeatedly refilled with the fluid from the additive tank 58, and the pump 52 continuously directing the fluid dispensed from the first measuring tube 53 and the second measuring tube 63 to the injection point for injection.

The continuous dispensing and injection process may continue indefinitely. For example, the process may continue until the control unit 30 is commanded by an operator to stop the process, a desired number of dispensing cycles have been carried out, a desired volume of fluid has been dispensed for injection, a desired time has elapsed, or all or a predetermined volume of the fluid in the additive tank 58 has been injected. Once the continuous dispensing and injection process has been completed, the control unit 30 may calculate the total volume of fluid transferred from the additive tank 58, the total volume of fluid dispensed from the first measuring tube 53 and from the second measuring tube 63, the total volume of fluid dispensed during the process, and the volume of fluid remaining in the additive tank 58 if desired.

The example use and operation of the alternative example embodiment of the continuous fluid metering system 10 (FIGS. 4-5) as illustrated in FIG. 6 is essentially the same as the use and operation of the example embodiment (FIGS. 1-2) illustrated in FIG. 3 and described above, with several exceptions. First, the control unit 30 sequentially places the three-way fill valve 76 in the first state and the second state to carry out the first initial fill cycle with respect to the first measuring tube 53 and the second initial fill cycle with respect to the second measuring tube 63. When the three-way fill valve 76 is in the first state, the control unit 30 places the three-way injection valve 77 in the second state. When the three-way fill valve 76 is in the second state, the control unit 30 places the three-way injection valve 77 in the first state. This isolates the first measuring tube 53 and the second measuring tube 63 from the pump 52 and the injection point while the first initial fill cycle and the second initial fill cycle are being carried out. Second, the control unit 30 alternately places the three-way injection valve 77 in the first state and the second state to alternately initiate and to switch between the first initial dispensing cycle and the second initial dispensing cycle, and to alternately initiate and to switch between the subsequent dispensing cycles of the first plurality of subsequent dispensing cycles and the subsequent dispensing cycles of the second plurality of subsequent dispensing cycles. Third, the control unit 30 alternately places the three-way fill valve 76 in the first state and the second state to alternately carry out the refill cycles of the first plurality of subsequent refill cycles with respect to the first measuring tube 53 and the refill cycles of the second plurality of subsequent refill cycles with respect to the second measuring tube 63.

Any and all headings are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All publications, patent applications, patents, and other references mentioned herein are incorporated by reference in their entirety to the extent allowed by applicable law and regulations.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network, such as the Internet.

At least one embodiment of the continuous fluid metering system is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, the computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present invention may be embodied in other specific forms without departing from the spirit or essential attributes thereof, and it is therefore desired that the present embodiment be considered in all respects as illustrative and not restrictive. Many modifications and other embodiments of the continuous fluid metering system will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the continuous fluid metering system, suitable methods and materials are described above. Thus, the continuous fluid metering system is not intended to be limited to the embodiments shown, but is to be accorded the widest scope consistent with the principles and features disclosed herein.

What is claimed is:

1. A fluid metering system, comprising:
   an additive tank for holding a fluid;
   a first measuring tube coupled to the additive tank and adapted to receive the fluid from the additive tank and to dispense the fluid;
   a second measuring tube coupled to the additive tank and adapted to receive the fluid from the additive tank and to dispense the fluid;
   a first fill valve coupled to the additive tank and to the first measuring tube, wherein the first fill valve is operable to selectively transfer the fluid from the additive tank to the first measuring tube;
   a second fill valve coupled to the additive tank and to the second measuring tube, wherein the second fill valve is operable to selectively transfer the fluid from the additive tank to the second measuring tube;
   a first injection valve coupled to the first measuring tube, wherein the first injection valve is operable to selectively direct the fluid dispensed from the first measuring tube to a fluid injection point;
   a second injection valve coupled to the second measuring tube, wherein the second injection valve is operable to selectively direct the fluid dispensed from the second measuring tube to the fluid injection point; and
   a control unit in communication with the first fill valve, the second fill valve, the first injection valve, and the second injection valve, wherein the control unit is configured to:
      control the first injection valve and the second injection valve to carry out a plurality of fluid dispensing cycles wherein the fluid alternately is dispensed from the first measuring tube and directed to the injection point by the first injection valve, and is dispensed from the second measuring tube and directed by the second injection valve to the injection point, so that the fluid is provided at the injection point substantially continuously; and
      control the first fill valve and the second fill valve to carry out a plurality of fluid refill cycles wherein the fluid alternately is transferred from the additive tank to the first measuring tube by the first fill valve and to the second measuring tube by the second fill valve to alternately refill the first measuring tube and the second measuring tube with the fluid.

2. The fluid metering system of claim 1, wherein:
   the fluid comprises at least one of water, a scale inhibitor, a corrosion inhibitor, a desalination chemical and a biocide; and
   the fluid injection point comprises an oil well.

3. The fluid metering system of claim 1, comprising a pump, wherein the pump is coupled to the first measuring tube, to the second measuring tube, and to the fluid injection point, wherein the pump is operable to pump the fluid dispensed from the first measuring tube through the first injection valve to the fluid injection point and the fluid dispensed from the second measuring tube through the second injection valve to the fluid injection point.

4. The fluid metering system of claim 1, wherein the control unit is configured to control the first fill valve and the second fill valve to carry out:
   a first initial fill cycle wherein the fluid is transferred from the additive tank to the first measuring tube by the first fill valve to fill the first measuring tube with the fluid before the control unit carries out the plurality of fluid dispensing cycles; and
   a second initial fill cycle wherein the fluid is transferred from the additive tank to the second measuring tube by the second fill valve to fill the second measuring tube with the fluid before the control unit carries out the plurality of fluid dispensing cycles.

5. The fluid metering system of claim 4, wherein the control unit is configured to control the first fill valve and the second fill valve to carry out the first initial fill cycle and the second initial fill cycle substantially simultaneously.

6. The fluid metering system of claim 1, wherein the control unit is configured to control the first fill valve, the second fill valve, the first injection valve, and the second injection valve to carry out the plurality of fluid refill cycles substantially simultaneously with the plurality of fluid dispensing cycles.

7. The fluid metering system of claim 1, wherein the control unit is configured to:
   determine a first volume of the fluid dispensed from the first measuring tube during each fluid dispensing cycle of the plurality of fluid dispensing cycles in which the fluid was dispensed from the first measuring tube;
   determine a second volume of the fluid dispensed from the second measuring tube during each fluid dispensing cycle of the plurality of fluid dispensing cycles in which the fluid was dispensed from the second measuring tube;
   calculate from the first volume and the second volume a total volume of the fluid dispensed during the plurality of fluid dispensing cycles.

8. The fluid metering system of claim 1, wherein the control unit is configured to determine the volume of the fluid remaining in the additive tank following each fluid refill cycle of the plurality of fluid refill cycles.

9. The fluid metering system of claim 1, wherein the control unit is configured to:
   determine a first volume of the fluid dispensed from the first measuring tube as the fluid is being dispensed;
   determine a second volume of the fluid dispensed from the second measuring tube as the fluid is being dispensed.

10. The fluid metering system of claim 9, comprising:
    a first sensor coupled to the first measuring tube, wherein the first sensor is adapted to provide an indication of the volume of the fluid in the first measuring tube as the fluid is being dispensed;
    a second sensor coupled to the second measuring tube, wherein the second sensor is adapted to provide an indication of the volume of the fluid in the second measuring tube as the fluid is being dispensed;
    wherein the control unit is in communication with the first sensor and the second sensor; and
    wherein the control unit is configured to:
      determine the first volume of the fluid dispensed from the first measuring tube as it is being dispensed based on the indication of the volume of the fluid in the first measuring tube provided by the first sensor; and
      determine the second volume of the fluid dispensed from the second measuring tube as it is being dispensed based on the indication of the volume of the fluid in the second measuring tube provided by the second sensor.

11. The fluid metering system of claim 9, wherein the control unit is configured alternately to control the first injection valve to direct the fluid dispensed from the first measuring tube to the fluid injection point and to control the second injection valve to direct the fluid dispensed from the second measuring tube to the fluid injection point based on the control unit determining the first volume of the fluid dispensed from the first measuring tube and the second volume of the fluid dispensed from the second measuring tube.

12. The fluid metering system of claim 9, wherein the control unit is configured alternately to control the first fill valve to transfer the fluid from the additive tank to the first measuring tube to refill the first measuring tube with the fluid, and to control the second fill valve to transfer the fluid from the additive tank to the second measuring tube to refill the second measuring tube with the fluid based on the control unit determining the first volume of the fluid dispensed from the first measuring tube and the second volume of the fluid dispensed from the second measuring tube.

13. The fluid metering system of claim 9, wherein:
    the control unit being configured to determine a first volume of the fluid dispensed from the first measuring tube as the fluid is being dispensed comprises the control unit being configured to:
      determine the initial volume of the fluid in the first measuring tube before the fluid is dispensed from the first measuring tube;
      determine the remaining volume of the fluid in the first measuring tube periodically as the fluid is dispensed from the first measuring tube;
      subtract the remaining volume from the initial volume; and
    the control unit being configured to determine a second volume of the fluid dispensed from the second measuring tube as the fluid is being dispensed comprises the control unit being configured to:
      determine the initial volume of the fluid in the second measuring tube before the fluid is dispensed from the second measuring tube;
      determine the remaining volume of the fluid in the second measuring tube periodically as the fluid is dispensed from the second measuring tube; and
      subtract the remaining volume from the initial volume.

14. The fluid metering system of claim 9, wherein the control unit is configured to:
    determine whether the first volume of the fluid dispensed from the first measuring tube has reached a first value; and
    determine whether the second volume of the fluid dispensed from the second measuring tube has reached a second value.

15. The fluid metering system of claim 14, wherein the control unit is configured to:
    based on determining the first volume of the fluid dispensed from the first measuring tube has reached the first value, substantially simultaneously:
      control the first injection valve to prevent the first injection valve from directing the fluid dispensed from the first measuring tube to the injection point; and control the second injection valve to direct the fluid dispensed from the second measuring tube to the injection point; and based on determining the second volume of the fluid dispensed from the second measuring tube has reached the second value, substantially simultaneously:
control the first injection valve to direct the fluid dispensed from the first measuring tube to the injection point; and
control the second injection valve to prevent the second injection valve from directing the fluid dispensed from the second measuring tube to the injection point.

16. The fluid metering system of claim 14, wherein the control unit is configured to:
based on determining the first volume of the fluid dispensed from the first measuring tube has reached the first value, control the first fill valve to transfer the fluid from the additive tank to the first measuring tube to refill the first measuring tube with the fluid; and
based on determining the second volume of the fluid dispensed from the second measuring tube has reached the second value, control the second fill valve to transfer the fluid from the additive tank to the second measuring tube to refill the second measuring tube with the fluid.

17. The fluid metering system of claim 14, wherein:
the control unit being configured to determine whether the first volume of the fluid dispensed from the first measuring tube has reached a first value comprises the control unit being configured to:
determine the initial volume of the fluid in the first measuring tube before the fluid is dispensed from the first measuring tube;
determine the remaining volume of the fluid in the first measuring tube periodically as the fluid is dispensed from the first measuring tube;
subtract the remaining volume from the initial volume to get a first result; and
compare the first result to the first value; and
the control unit being configured to determine whether the second volume of the fluid dispensed from the first measuring tube has reached a second value comprises the control unit being configured to:
determine the initial volume of the fluid in the second measuring tube before the fluid is dispensed from the second measuring tube;
determine the remaining volume of the fluid in the second measuring tube periodically as the fluid is dispensed from the second measuring tube;
subtract the remaining volume from the initial volume to get a second result; and
compare the second result to the second value.

18. A fluid metering system, comprising:
an additive tank for holding a fluid;
a first measuring tube coupled to the additive tank and adapted to receive the fluid from the additive tank and to dispense the fluid;
a second measuring tube coupled to the additive tank and adapted to receive the fluid from the additive tank and to dispense the fluid;
a fill valve coupled to the additive tank, to the first measuring tube, and to the second measuring tube, wherein the fill valve is selectively operable to be in a first state and a second state, wherein in the first state the fill valve is adapted to transfer the fluid from the additive tank to the first measuring tube and in the second state the fill valve is adapted to transfer the fluid can from the additive tank to the second measuring tube;
an injection valve coupled to the first measuring tube and to the second measuring tube, wherein the injection valve is selectively operable to be in a first state and in a second state, wherein in the first state the injection valve is adapted to direct the fluid dispensed from the first measuring tube to a fluid injection point and in the second state the injection valve is adapted to direct the fluid dispensed from the second measuring tube to the fluid injection point; and
a control unit in communication with the fill valve and the injection valve, wherein the control unit is configured to:
control the injection valve to carry out a plurality of fluid dispensing cycles wherein the fluid alternately is dispensed from the first measuring tube and directed to the injection point by the injection valve in the first state, and is dispensed from the second measuring tube and directed to the injection point by the injection valve in the second state, so that the fluid is provided at the injection point substantially continuously; and
control the fill valve to carry out a plurality of fluid refill cycles wherein the fluid alternately is transferred from the additive tank to the first measuring tube by the fill valve in the first state and to the second measuring tube by the fill valve in the second state to alternately refill the first measuring tube and the second measuring tube with the fluid.

19. The fluid metering system of claim 18, wherein:
the fluid comprises at least one of water, a scale inhibitor, a corrosion inhibitor, a desalination chemical and a biocide; and
the fluid injection point comprises an oil well.

20. The fluid metering system of claim 18, comprising a pump, wherein the pump is coupled to the first measuring tube, to the second measuring tube, and to the fluid injection point, wherein the pump is operable to pump the fluid dispensed from the first measuring tube through the injection valve in the first state to the fluid injection point and the fluid dispensed from the second measuring tube through the injection valve in the second state to the fluid injection point.

21. The fluid metering system of claim 18, wherein the control unit is configured to control the fill valve to carry out:
a first initial fill cycle wherein the fluid is transferred from the additive tank to the first measuring tube by the fill valve in the first state to fill the first measuring tube with the fluid before the control unit carries out the plurality of fluid dispensing cycles; and
a second initial fill cycle wherein the fluid is transferred from the additive tank to the second measuring tube by the fill valve in the second state to fill the second measuring tube with the fluid before the control unit carries out the plurality of fluid dispensing cycles.

22. The fluid metering system of claim 18, wherein the control unit is configured to control the fill valve and the injection valve to carry out the plurality of fluid refill cycles substantially simultaneously with the plurality of fluid dispensing cycles.

* * * * *